United States Patent
Schneider et al.

(10) Patent No.: US 12,429,853 B2
(45) Date of Patent: Sep. 30, 2025

(54) METHOD FOR CONTROLLING AND/OR MONITORING A CHEMICAL PRODUCTION PLANT

(71) Applicant: BASF SE, Ludwigshafen (DE)

(72) Inventors: Hayder Schneider, Ludwigshafen (DE); Rene Koenig, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 510 days.

(21) Appl. No.: 17/786,119

(22) PCT Filed: Dec. 18, 2020

(86) PCT No.: PCT/EP2020/087327
§ 371 (c)(1),
(2) Date: Jun. 16, 2022

(87) PCT Pub. No.: WO2021/123385
PCT Pub. Date: Jun. 24, 2021

(65) Prior Publication Data
US 2023/0026440 A1    Jan. 26, 2023

(30) Foreign Application Priority Data

Dec. 20, 2019 (EP) ..................................... 19218985

(51) Int. Cl.
*G05B 19/418* (2006.01)
*G05B 23/02* (2006.01)

(52) U.S. Cl.
CPC ......... *G05B 19/418* (2013.01); *G05B 23/024* (2013.01); *G05B 2219/32077* (2013.01)

(58) Field of Classification Search
CPC .................................................. G05B 23/024
(Continued)

(56) References Cited

U.S. PATENT DOCUMENTS

| 2,597,701 A | 5/1952 | Beller |
| 2,612,440 A | 9/1952 | Altmann |

(Continued)

FOREIGN PATENT DOCUMENTS

| CN | 103046033 A | 4/2013 |
| DE | 1433361 A1 | 12/1968 |

(Continued)

OTHER PUBLICATIONS

Syrkin et al., "Relationship Between the Electromagnetic and Physicochemical Properties of Carbonyl Iron Powder", Translated from Poroshkovaya Metallurgiya, No. 7 (43), pp. 38-44, Jul. 1966.

(Continued)

*Primary Examiner* — Jigneshkumar C Patel
(74) *Attorney, Agent, or Firm* — Lowenstein Sandler LLP

(57) ABSTRACT

A computer-implemented method for controlling and/or monitoring a production plant (110) is proposed. The production plant (110) comprises at least one process chain (112) comprising at least one batch process (114). The method comprises the following steps: a) at least one step of determining of input data (132), wherein the input data comprises at least one quality criterion and production plant layout data, wherein the step comprises retrieving the production plant layout data and receiving information relating to the quality criterion via at least one communication interface (158); b) at least one prediction step (134), wherein in the prediction step operating conditions for operating the production plant (110) are determined by applying at least one trained model (136) on the input data, wherein the trained model (136) is at least partially data-driven by being trained on sensor data from historical production runs; c) at least one control and/or monitoring step (140), wherein the operating conditions are provided.

18 Claims, 5 Drawing Sheets

(58) Field of Classification Search
USPC .................................................. 700/95
See application file for complete search history.

(56) References Cited

U.S. PATENT DOCUMENTS

| | | | |
|---|---|---|---|
| 2,851,347 | A | 9/1958 | Leo |
| 4,113,480 | A | 9/1978 | Rivers |
| 4,197,118 | A | 4/1980 | Wiech, Jr. |
| 4,652,305 | A | 3/1987 | Ebenhoech et al. |
| 5,085,690 | A | 2/1992 | Ebenhoech et al. |
| 2011/0073687 | A1* | 3/2011 | Makino ............... B02C 19/065 241/39 |
| 2012/0084110 | A1* | 4/2012 | Wu ...................... G06Q 10/08 705/7.13 |
| 2019/0198136 | A1* | 6/2019 | Hou ...................... G16C 20/90 |
| 2020/0402226 | A1* | 12/2020 | Peng ..................... G06N 20/00 |
| 2021/0004683 | A1 | 1/2021 | Matsumura |
| 2021/0012242 | A1* | 1/2021 | Subbiah ............... G06N 20/00 |
| 2021/0101211 | A1* | 4/2021 | Memoli ............... B22F 9/082 |

FOREIGN PATENT DOCUMENTS

| | | | |
|---|---|---|---|
| DE | 3216362 | A1 | 11/1982 |
| DE | 3428121 | A1 | 2/1986 |
| DE | 3940347 | A1 | 6/1991 |
| DE | 102005030613 | A1 | 1/2007 |
| GB | 695925 | A | 8/1953 |
| JP | 08057593 | A | 3/1996 |
| SU | 1186398 | A1 | 10/1985 |
| WO | 2014049016 | A1 | 4/2014 |
| WO | 2019188931 | A1 | 10/2019 |

OTHER PUBLICATIONS

Ebenhoech, "Carbonyl iron powder production, properties and applications", Progress in powder Metallurgy (42), 1986, 12 pages.
Syrkin, et al., "Preparation of Iron Powder by the Thermal Decomposition of Iron Pentacarbonyl", Translated from Poroshkovaya Metallurgiya, No. 3(21), pp. 75-84, May-Jun. 1964 Original article submitted Jan. 27, 1963 "About New process using atomization of liquid IPC into an decomposer".
International Search Report for PCT/EP2020/087327 mailed Mar. 18, 2021, 2 pages.

* cited by examiner

METHOD FOR CONTROLLING AND/OR MONITORING A CHEMICAL PRODUCTION PLANT

CROSS-REFERENCE TO RELATED APPLICATION SECTIONS

The present application is a national stage entry of International Application No. PCT/EP2020/087327, filed on Dec. 18, 2020, which claims priority to European Patent Application No. 19218985.0, filed on Dec. 20, 2019, the contents of which are hereby incorporated by reference in their entirety.

TECHNICAL FIELD

The invention relates to a computer-implemented method for controlling and/or monitoring a production plant, a computer program and a controlling system. The invention specifically may be used for industrial powder production, such as for carbon black, nickel, iron, zinc oxide, or titanium dioxide production. Other applications are possible.

BACKGROUND ART

Industrial powder production of high-purity nano-sized powder, having typical particle sizes from 1 to 100 nm, and micro-sized powder, having typical particle size from 0.1 to 10 µm, such as carbon black, nickel, iron, zinc oxide, or titanium dioxide can be performed in an aerosol process involving continuous flame, hot-wall, or spray pyrolysis reactors.

For example, carbonyl iron powder (CIP) production is described by U.S. Pat. No. 2,612,440, GB 695925, U.S. Pat. Nos. 2,597,701, 2,851,347, DE 1433361, DE 3428121, DE 3940347, U.S. Pat. Nos. 4,197,118, 4,113,480, SU 1186398, DE 102005030613, WO 2014/049016, CN 103046033, Syrkin, Tolmasski, Petrova, Translated from Poroshkovaya Metallurgiya, No. 7 (43), pp. 38-44, July 1966, Mittasch, Zeitschrift für angewandte Chemie, "Über Eisencarbonyl und Carbonyleisen", 28 Jul. 1928, (30), 827, Syrkin; Translated from Poroshkovaya Metallurgiya, No. 3(21), pp. 75-84, May-June 1964 Original article submitted Jan. 27, 1963 "About new process using atomization of liquid IPC into an decomposer", Ebenhoech, Progress in powder Metallurgy (42), 1986, "Carbonyl iron powder production, properties and applications".

Raw powder properties, such as particle size distribution, morphology, degree of agglomeration, surface chemistry, or phase composition depend strongly on the chemical reaction and particle growth in the aerosol reactor. The raw powder properties can be further modified by subsequent mechanical, thermal, and/or mixed thermal and/or chemical processes in unit operations or reactors, such as mills, screens, sieves, ovens, calciners, rotary kilns, or fluidized beds. The control of both the aerosol reactor and the subsequent unit operations or reactors is crucial for determining the application specific powder properties. In practice, the first-principles laws that determine the application-specific powder properties are unknown. Therefore, the control of the production processes involves a high degree of empiricism and manual optimization, which makes the powder production complex and error-prone.

WO 2019/188931 A1 describes a winding condition generation device, a winding device, a winding defect level predicted value generation device, a winding condition calculation method, a winding method, and a winding defect level predicted value generation method. The winding condition generation device is provided with an input unit, an output unit, and a condition calculation unit, wherein: the condition calculation unit is provided with a learning model produced by machine learning, using, as teaching data, a combination of a winding condition and a winding parameter used when a winding web satisfying a target winding quality is produced, and uses the learning model to calculate the winding condition of a new winding web from the winding parameter of the new winding web inputted from the input unit; and the output unit outputs the winding condition. The winding parameter includes the width of a web, the speed of conveying the web, and the winding length of the web. The winding condition includes the tension of the web at the time of start of winding of the web and the tension of the web at the time of end of winding of the web.

Problem to be Solved

It is therefore desirable to provide methods and devices which address the above-mentioned technical challenges. Specifically, devices and methods for controlling and/or monitoring a production plant shall be provided which allow less complex, robust and improved controlling of the production plant.

SUMMARY

This problem is addressed by a computer-implemented method for controlling and/or monitoring a production plant, a computer program and a controlling system with the features of the independent claims. Advantageous embodiments which might be realized in an isolated fashion or in any arbitrary combinations are listed in the dependent claims.

As used in the following, the terms "have", "comprise" or "include" or any arbitrary grammatical variations thereof are used in a non-exclusive way. Thus, these terms may both refer to a situation in which, besides the feature introduced by these terms, no further features are present in the entity described in this context and to a situation in which one or more further features are present. As an example, the expressions "A has B", "A comprises B" and "A includes B" may both refer to a situation in which, besides B, no other element is present in A (i.e. a situation in which A solely and exclusively consists of B) and to a situation in which, besides B, one or more further elements are present in entity A, such as element C, elements C and D or even further elements.

Further, it shall be noted that the terms "at least one", "one or more" or similar expressions indicating that a feature or element may be present once or more than once typically will be used only once when introducing the respective feature or element. In the following, in most cases, when referring to the respective feature or element, the expressions "at least one" or "one or more" will not be repeated, non-withstanding the fact that the respective feature or element may be present once or more than once.

Further, as used in the following, the terms "preferably", "more preferably", "particularly", "more particularly", "specifically", "more specifically" or similar terms are used in conjunction with optional features, without restricting alternative possibilities. Thus, features introduced by these terms are optional features and are not intended to restrict the scope of the claims in any way.

The invention may, as the skilled person will recognize, be performed by using alternative features. Similarly, features introduced by "in an embodiment of the invention" or similar expressions are intended to be optional features, without any restriction regarding alternative embodiments of the invention, without any restrictions regarding the scope of the invention and without any restriction regarding the possibility of combining the features introduced in such way with other optional or non-optional features of the invention.

In a first aspect of the present invention, a computer-implemented method for controlling and/or monitoring a production plant is proposed.

The term "computer-implemented" as used herein is a broad term and is to be given its ordinary and customary meaning to a person of ordinary skill in the art and is not to be limited to a special or customized meaning. The term specifically may refer, without limitation, to a process which is fully or partially implemented by using a data processing means, such as data processing means comprising at least one processor. The term "computer", thus, may generally refer to a device or to a combination or network of devices having at least one data processing means such as at least one processor. The computer, additionally, may comprise one or more further components, such as at least one of a data storage device, an electronic interface or a human-machine interface.

The term "production plant" as used herein is a broad term and is to be given its ordinary and customary meaning to a person of ordinary skill in the art and is not to be limited to a special or customized meaning. The term specifically may refer, without limitation, to a device or system of devices or complex of devices for producing and/or manufacturing and/or generating and/or processing at least one product. The production plant may be a chemical production plant. In particular, the production plant may be a powder production plant configured for producing at least one powder.

The term "chemical production plant" may refer without limitation to any technical infrastructure that is used for an industrial purpose of manufacturing, producing or processing of one or more chemical products, i.e., a manufacturing or production process or a processing performed by the chemical production plant. Accordingly, the chemical production plant may be one or more of a process plant, a pharmaceutical plant, a fossil fuel processing facility such as an oil and/or a natural gas well, a refinery, a petro-chemical plant, a cracking plant, and the like. The chemical production plant can even be any of a distillery, a treatment plant, or a recycling plant. The chemical production plant can even be a combination of any of the examples given above or their likes. Further, a chemical production plant typically comprises a plurality of sensors and at least one controlling system for controlling at least one parameter related to the process, or process parameter, in the chemical production plant. Such control functions are usually performed by the controlling system or controller in response to at least one measurement signal from at least one of the sensors.

The term "chemical product" in this disclosure may refer to any industrial product, such as chemical, pharmaceutical, nutritional, cosmetic, a biological product, a beverage, a textile, a metal, a plastic or even any of their combination. The chemical product may either consist entirely of natural components, or it may at least partially comprise one or more synthetic components. Some non-limiting examples of the chemical product are, organic or inorganic compositions, monomers, polymers, foams, pesticides, herbicides, fertilizers, feed, nutrition products, precursors, pharmaceuticals or treatment products, or any one or more of their components or active ingredients. In some cases, the chemical product may even be a product usable by an end-user or consumer, for example, a cosmetic or pharmaceutical composition. The chemical product may even be a product that is usable for making further one or more products, for example, the chemical product may be a synthetic foam usable for manufacturing soles for shoes, or a coating usable for automobile exterior. The chemical product may be in any form, for example, in the form of solid, semi-solid, paste, liquid, emulsion, solution, pellets, granules, or powder. Additionally, or alternatively, the chemical product can even be a service product, for example, recovery or waste treatment such as recycling, chemical treatment such as breakdown or dissolution into one or more chemical products.

The production plant may comprise equipment, also denoted as or processing units, such as any one or more of a heat exchanger, a column such as a fractionating column, a furnace, a reaction chamber, a cracking unit, a storage tank, an extruder, a pelletizer, a precipitator, a blender, a mixer, a cutter, a curing tube, a vaporizer, a filter, a sieve, a pipeline, a stack, a filter, a valve, an actuator, a mill, a transformer, a conveying system, a circuit breaker, a machinery e.g., a heavy duty rotating equipment such as a turbine, a generator, a pulverizer, a compressor, an industrial fan, a pump, a transport element such as a conveyor system, a motor, etc. The term "equipment" may refer to any one or more assets within the production plant. As nonlimiting examples, the equipment may refer to any one or more, or any of their combination of, computing units or controllers, sensors, actuators, end effector units, transport elements such as conveyor systems, heat exchangers such as heaters, furnaces, cooling units, reactors, mixers, millers, choppers, compressors, slicers, extruders, dryers, sprayers, pressure or vacuum chambers, tubes, bins, silos and any other kind of apparatus which is used directly or indirectly for or during production in the industrial plant. Preferably, the equipment refers specifically to those assets, apparatuses or components which are involved directly or indirectly in the production process. More preferably, those assets, apparatuses or components which can influence the performance of the chemical product. An equipment may be buffered or they may be unbuffered. Moreover, the equipment may involve mixing or no mixing, separation or no separation. Some non-limiting examples of unbuffered equipment without mixing are, conveyor system or belt, extruder, pelletizer, and heat exchanger. Some non-limiting examples of buffered equipment without mixing are, buffer silo, bins, etc. Some non-limiting examples of buffered equipment with mixing are, silo with mixer, mixing vessel, cutting mill, double cone blender, curing tube, etc. Some non-limiting examples of unbuffered equipment with mixing are, static or dynamic mixer, etc. Some non-limiting examples of buffered equipment with separation are, column, separator, extraction, thin film vaporizer, filter, sieve, etc. The equipment may even be or it may include a storage or packaging element such as, octabin filling, drum, bag, tank truck.

The production plant comprises at least one process chain. The term "process chain" as used herein is a broad term and is to be given its ordinary and customary meaning to a person of ordinary skill in the art and is not to be limited to a special or customized meaning. The term specifically may refer, without limitation, to a sequence of processes or production steps performed in the at least one processing unit or in a plurality of processing units. The process chain may comprise steps or processes, which may be performed simultaneously and/or steps or processes which may be performed successively. The process chain may comprise at least one production line. The process chain may comprise multiple production lines, in particular multiple production lines, which can be operated in parallel.

The production plant may comprise at least two sequential processes, in particular at least two chemical processes. The term "sequential processes" may refer to at least two processes following each other. Each of the processes may have different operating parameters. Specifically, a subsequent second process may be influenced by a previous first process, wherein, in particular, at least one parameter of first process may determine parameters from second process. The sequential processes with separate parameters may be harder or more difficult to control, in particular, if at least one of the two processes is a chemical process. The method for controlling and/or monitoring according to the present invention may allow reliable and simplified controlling of sequential processes.

The process chain comprises at least one batch process. The term "batch process" as used herein is a broad term and is to be given its ordinary and customary meaning to a person of ordinary skill in the art and is not to be limited to a special or customized meaning. The term specifically may refer, without limitation, to a process wherein processing units are in chronological order and directly related to the production process. The process chain may comprise multiple batch processes. The batch process may be configured to control at least one property of the product. The batch process may comprise at least one mechanical and/or at least one thermal and/or at least one chemical process. The batch process may comprise processing unit operations, also denoted finishing operations, comprising one or more of milling, mixing, sieving, screening, hydrogen annealing, coating and combinations thereof. The production plant may comprise at least one unit selected from the group consisting of: at least one mill, at least one screen, at least one sieve, at least one oven, at least one calciner, at least one rotary kiln, at least one fluidized bed.

The process chain may comprise at least one continuous process. The term "continuous process" as used herein is a broad term and is to be given its ordinary and customary meaning to a person of ordinary skill in the art and is not to be limited to a special or customized meaning. The term specifically may refer, without limitation, to a flow production method without interruption. The process chain may comprise batch and continuous processes. The process chain may comprise semi-continuous and/or semi-batch processes. For example, the process chain may comprise at least one continuous process and a plurality of batch processes. The production plant may be configured for continuous processing and/or batch processing. The production plant may comprise a plurality of parallel continuous and/or batch processes. The continuous and/or batch processes may be combined in different ways. The combination of continuous and batch processes may depend on at least one criterion such as a quality for the product. The combination of continuous and batch processes may be selected to take the best route through the process chain based on the quality criterion. Additionally, other criteria may be possible such as an order queue or the like.

For example, the production plant may be a powder production plant configured for producing at least one powder. The powder may be a nano-sized powder, e.g. with particle sizes from 1 to 100 nm, or a micro-sized powder, e.g. with particle sizes from 0.1 to 10 μm. The powder may be at least one powder selected from the group consisting of: carbonyl iron powder (CIP); iron powder; carbon black; nickel; iron; zinc oxide; titanium dioxide.

In particular, the production plant may be a powder production plant for production of carbonyl iron powder (CIP). Carbonyl iron powder may be produced for various industrial applications such as for metal injection molding, coil cores, radar absorption, diamond tools and the like. CIP is a high purity micro-sized iron powder. CIP can be produced by thermal decomposition of Iron pentacarbonyl. CIP may be produced via a hot-wall aerosol process, in which gaseous iron pentacarbonyl (IPC) is decomposed into Fe and CO. The production plant may comprise at least one evaporator or may be connected to at least one evaporator. The production plant may comprise at least one reactor. The reactor may be or may be part of the continuous process of the process chain. Liquid iron pentacarbonyl (IPC), which may be produced in a separate cabonylation-plant or an upstream process step, may be fed to the evaporator, where the liquid is heated up to about 104° C. IPC boils and the generated pure gas may be fed to the reactor of the production plant. The reactor may be a cylindrical reactor with a certain length and diameter. The reactor may be wall-heated up to 550° C. IPC is decomposed quantitatively to iron and 5 moles CO-gas in an endothermic reaction. The temperature in the reaction zone is typically between 250° C. and 350° C. The Fe-particles formed in the gas phase may be μm-sized spherical particles.

Raw-CIP produced by the reactor typically contains some impurities, e.g. hard CIP contains C or N or O (Σ~2 wt %), which result from different side reactions happening on the surface of catalytically active iron particles. Specifically, if no ammonia is fed to the system Fe-Carbides and -oxides can be found in the structure; if ammonia is added to the reaction gases nearly no Fe-oxides are formed but -nitrides and -carbides. Raw-CIP properties may be controlled via one or more of feed composition, temperatures of the inflow gases, the reactor geometry, reactor size, reactor wall temperature. The process chain may comprise at least one raw-CIP classifying step, wherein material formed in the reactor at a bottom of the reactor or off-gas of the reactor, such as 5 mole CO per mole IPC, may be used to classify the produced raw-CIP into at least two or more fractions. The IPC and the raw-CIP production may be done in a continuous process.

Raw-CIP may be further processed in at least one batch process to produce a finished product. As outlined above, the process chain comprises at least one batch process. For example, the raw-CIP may be fed into containers and may be processed afterwards in differing batch processes according to the requirements of the desired and/or planned and/or wanted finished product. The production plant may be configured for producing different kind of finished CIP, so-called grades. The grades may be produced on multiple production lines. The grades may depend on application specific properties and quality criteria. The quality criteria may be specified by the industrial application of the CIP. The quality criteria may be defined in order to guarantee proper functioning for the application. Properties of the finished CIP product may comprise one or more of particle size distribution, morphology, degree of agglomeration, surface chemistry, and phase composition. The properties of the finished CIP product, i.e. the outcome of the process chain, may be controlled by subsequent solid processing unit operations comprising one or more of milling, mixing, sieving, screening, hydrogen annealing, coating and combinations thereof. The production plant may comprise at least one unit selected from the group consisting of: at least one mill, at least one screen, at least one sieve, at least one oven, at least one calciner, at least one rotary kiln, at least one fluidized bed. The raw-CIP properties may be modified by mechanical and/or thermal and/or chemical processes. The milling may comprise destroying agglomerates and/or aggregates. The mixing may comprise homogenizing larger batches. The sieving may comprise fine-tuning of the particle size distribution. The subsequent adjustment of the properties may require a lot of corporate know-how and/or manual batch manipulations.

The production process of the CIP requires a high degree of flexibility to meet diverse specifications. Since in powder production intermediate quality inspections and/or first principles understanding of the phenomena governing the powder properties are often missing and/or are incomplete, it is usually difficult to detect quality problems at every step of the production. This may result in that an erroneous or non-suitable product is carried through the different steps and is only detected at a final quality check at the end of the process chain. Under such conditions the risk of production failures and production of none-suitable CIP batches is high. The present invention proposes a method which allows for producing under optimal production conditions to meet the required properties and/or quality criteria.

The method comprises the following method steps which, specifically, may be performed in the given order. Still, a different order is also possible. It is further possible to perform two or more of the method steps fully or partially simultaneously. Further, one or more or even all of the method steps may be performed once or may be performed repeatedly, such as repeated once or several times. Further, the method may comprise additional method steps which are not listed.

The method comprises the following steps:
a) at least one step of determining of input data, wherein the input data comprises at least one quality criterion and production plant layout data, wherein the step comprises retrieving the production plant layout data and receiving information relating to the quality criterion via at least one communication interface;
b) at least one prediction step, wherein in the prediction step operating conditions for operating the production plant are determined by applying at least one trained model on the input data, wherein the trained model is at least partially data-driven by being trained on sensor data from historical production runs;
c) at least one control and/or monitoring step, wherein the operating conditions are provided.

The term "input data" as used herein is a broad term and is to be given its ordinary and customary meaning to a person of ordinary skill in the art and is not to be limited to a special or customized meaning. The term specifically may refer, without limitation, to an input value or parameter for the trained model and/or data which can be filled into the trained model. The trained model is configured to generate based on the input data at least one prediction. The input data may be or may comprise a quantifiable variable of at least one parameter which can characterize the quality criterion. The input data may be or may comprise a quantifiable variable of at least one parameter which can characterize the plant layout data.

The input data comprises the quality criterion. The term "quality criterion" as used herein is a broad term and is to be given its ordinary and customary meaning to a person of ordinary skill in the art and is not to be limited to a special or customized meaning. The term specifically may refer, without limitation, to at least one property of the product, in particular the finished product, such as a value or range. The quality criterion may be an application dependent quality criterion. The quality criterion may comprise one or more of particle size distribution, morphology, degree of agglomeration, surface chemistry, and phase composition. The quality criterion may comprise at least one customer specification. The customer specification may comprise at least one range for at least one quality parameter. Based on the quality parameter the further processing along a customer value chain can be conducted. The trained model may be fed with the input data, in particular input parameters, relating to the quality criteria. Some of the input parameters may be provided by the customer. Others may be determined based on customer input. For example, the customer may specify the industrial application and specifications relevant for such application. Additional input parameters regarding the product properties may be calculated or retrieved from a data base.

The quality criterion may be provided by a customer via the communication interface. The term "communication interface" as used herein is a broad term and is to be given its ordinary and customary meaning to a person of ordinary skill in the art and is not to be limited to a special or customized meaning. The term specifically may refer, without limitation, to an item or element forming a boundary configured for transferring information. In particular, the communication interface may be configured for transferring information from a computational device, e.g. a computer, such as to send or output information, e.g. onto another device. Additionally or alternatively, the communication interface may be configured for transferring information onto a computational device, e.g. onto a computer, such as to receive information. The communication interface may specifically provide means for transferring or exchanging information. In particular, the communication interface may provide a data transfer connection, e.g. Bluetooth, NFC, inductive coupling or the like. As an example, the communication interface may be or may comprise at least one port comprising one or more of a network or internet port, a USB-port and a disk drive. The communication interface may be at least one web interface.

The input data comprises the production plant layout data. The term "production plant layout data" as used herein is a broad term and is to be given its ordinary and customary meaning to a person of ordinary skill in the art and is not to be limited to a special or customized meaning. The term specifically may refer, without limitation to physico-chemical values which, in particular, can be used in a white-box-model as will be described in more detail below. For example, the production plant layout data may comprise information about the production plant such design of the production pant and/or status such as in operation, in maintenance, maintenance planed, current operation status e.g. degradation status. The design may comprise parameters specifying the physical reactor design at hand such as the reactor geometry, number of reactors, plant layout such as continuous process or batch process. The production plant layout data may comprise real time data. The real time data may comprise information about a current state of the production plant. The term "information about a current state" may refer to arbitrary information relating to an operation status, e.g. obtained via sensor data from one or more sensors of the production plant. The production plant layout data may comprise pre-defined layout parameters. For example, the pre-defined layout parameters may comprise one or more of geometry, specifications such as minimum temperature, maximum temperature, speed and the like. The pre-defined layout data may be used for the white-box-model or for scheduling. The predefined layout parameters may be retrieved from at least one database via the communication interface. The term "database" as used herein is a broad term and is to be given its ordinary and customary meaning to a person of ordinary skill in the art and is not to be limited to a special or customized meaning. The term specifically may refer, without limitation, to an arbitrary collection of information, such as information stored in at least one data storage device. The database may comprise the at least one data storage device with the information stored therein. In particular, the database may contain an arbitrary collection of information. The database may be or may comprise at least one database selected from the group consisting of: at least one server, at least one server system comprising a plurality of servers, at least one cloud server or cloud computing infrastructure. The database may comprise at least one storage unit configured to store data.

The term "prediction" as used herein is a broad term and is to be given its ordinary and customary meaning to a person of ordinary skill in the art and is not to be limited to a special or customized meaning. The term specifically may refer, without limitation, to a result of the trained model. The prediction, in particular, may be an expected value of at least one operating condition for fulfilling the quality criterion. The trained model may be configured for predicting optimal production process conditions that yield required application-specific product properties, in particular powder properties. In other words, the determining of the operating conditions in step b) may comprise predicting operating conditions for operating the production plant. Specifically, in the prediction step predicted operating conditions for operating the production plant are determined. The control and/or monitoring step may be based on the predicted operating conditions. The control and/or monitoring step may comprise providing the predicted operating conditions. The operating conditions determined in step b) may comprise information about the best route. The predicted operating conditions may comprise a best route through the process chain. The term "route", or "production route", as used herein is a broad term and is to be given its ordinary and customary meaning to a person of ordinary skill in the art and is not to be limited to a special or customized meaning. The term specifically may refer, without limitation, to a combination of unit operations and/or a combination of processing units and/or a combination of processes or production steps, in particular comprising continuous and/or batch processes, performed and/or passed during the production process in the production plant. The term "best route" as used herein is a broad term and is to be given its ordinary and customary meaning to a person of ordinary skill in the art and is not to be limited to a special or customized meaning. The term specifically may refer, without limitation, to an optimal route through the production plant in terms of the at least one quality criterion. Thus, the optimal route, specifically, may be a route selected from a plurality of possible routes which maximizes or minimizes the at least one quality criterion. The best route may be a target route and/or final route and/or planned route. For example, the batch process may comprise different routes through the production plant depending on the quality criterion and/or workload of the production plant. Different processing unit operations may be combined for reaching and/or ensuring an optimum in terms of the at least one quality criterion.

The term "operating condition" as used herein is a broad term and is to be given its ordinary and customary meaning to a person of ordinary skill in the art and is not to be limited to a special or customized meaning. The term specifically may refer, without limitation, to production process conditions for operating the production plant, in particular production process conditions for one or a plurality or even for all units of the production plant. The operating conditions may comprise operating conditions for continuous processing units such as one or more of volumetric or mass flow rates, inflow composition, inflow temperature, concentrations, pressure, reactor wall temperatures, reactor geometry, reactor size. The operating conditions may comprise operating conditions for batch processing units such as one or more of residence time, pressure, volumetric or mass flow rates, inflow composition, inflow temperature, concentrations, wall temperatures, dosing recipe, reactor geometry, reactor size.

The term "trained model" as used herein is a broad term and is to be given its ordinary and customary meaning to a person of ordinary skill in the art and is not to be limited to a special or customized meaning. The term specifically may refer, without limitation, to a mathematical model which was trained on at least one training data set and which is configured for predicting at least one target variable for at least one input variable. Specifically, the input variable may be the quality criterion and plant layout data and the target variable may be the operating conditions. The trained model is at least partially data-driven by being trained on sensor data from historical production runs. The term "data driven model" as used herein is a broad term and is to be given its ordinary and customary meaning to a person of ordinary skill in the art and is not to be limited to a special or customized meaning. The term specifically may refer, without limitation, to an empirical, predictive model. Specifically, the data driven model is derived from analysis of experimental data. The data driven model may be a machine-learning tool.

The trained model may be trained with historical data comprising one or more of quality criteria of produced powder associated with data from process control, physical reactor design, plant layout and production runs. The trained model may be trained on data from historical production runs comprising one or more of historical production plant layout data, at least one historical quality criterion and sensor data reflecting historical operating conditions. Generally, training of the model may be based on reproducing a function, in this case the plant layout data, wherein the quality criteria are variables of the functions and the operating conditions are the functional values. As the operating conditions are reflected by the sensor data, the training of the model is based on sensor data. In addition, the training of the model may be at least partially based on historical plant layout data and quality criteria. The term "historical production run" refers to production runs in the past or at an earlier time point. The historical production runs may comprise quality criteria of produced products associated with data from one or more of process control, physical reactor design, plant layout and sensor data of production runs. The sensor data may comprise data from at least one temperature sensor, volumetric or mass flow rate sensor, pressure sensor, particle count sensor, weight sensor. As used herein, the term "at least partially data-driven model" is a broad term and is to be given its ordinary and customary meaning to a person of ordinary skill in the art and is not to be limited to a special or customized meaning. The term specifically may refer, without limitation, to the fact that the trained model comprises data-driven model parts and other model parts.

The trained model may be a hybrid model. A hybrid model may refer to a model that comprises first-principles parts, so called white box, as well as data-driven parts, so called black box, see e.g. review paper of Moritz von Stoch et al.: "Hybrid semi-parametric modeling in process systems engineering: Past, present and future", 2014, Computers & Chemical Engineering, pergamon press, Oxford, GB, vol. 60, 31 Aug. 2013, pages 86 to 101 XP028792356, ISSN: 0098-1354, DOI: 10.1016/J.COMPCHEMENG.2013.08.008. The trained model may comprise a combination of a white-box-model and a black-box-model. The white-box-model may be based on physico-chemical laws. The physico-chemical laws may be derived from first principles. The physico-chemical laws may comprise one or more of chemical kinetics, conservation laws of mass, momentum and energy, particle population in arbitrary dimension. The white-box-model may be selected according to the physico-chemical laws that govern the respective process step. The black-box-model may be based on sensor data from historical production runs. The black-box-model may be built by using one or more of machine learning, deep learning, neural networks, or other form of artificial intelligence. The black-box-model may be any model that yields a good fit between training and test data.

The trained model may comprise a serial or parallel architecture. In the serial architecture output of the white-box-model is used as input for the black-box-model or output of the black-box-model is used as input for the white-box-model. In the parallel architecture a combined output of the white-box-model and the black-box-model is determined such as by superposition of the outputs. For further details of serial and parallel architecture reference is made to the review paper of Moritz von Stoch et al.: "Hybrid semi-parametric modeling in process systems engineering: Past, present and future", 2014, Computers & Chemical Engineering, pergamon press, Oxford, GB, vol. 60, 31 Aug. 2013, pages 86 to 101 XP028792356, ISSN: 0098-1354, DOI: 10.1016/J.COMPCHEMENG.2013.08.008. For example, in raw-CIP production step, three submodels can be used to train the model based on process control data and reactor geometry. A first sub-model may predict a mean particle diameter based on a hybrid model with a chemical kinetics and population balance solver as white-box-model and a data-driven model that serves as a black-box corrector trained on historical data. This first sub-model may have a serial architecture, wherein the output of the white-box-model is input for the black-box-model, or the first sub-model may have parallel architecture. A second sub-model may predict a particle size distribution based on inputs from the first sub-model and residence time distributions obtained via Computational fluid Dynamics (CFD). The residence time distributions are transformed via the population balance solver to obtain particle size distributions (PSD). An error between the computed PSD and historical data can be learned by the data-driven model and can then applied for arbitrary predictions. The second sub-model may have a parallel architecture. A third sub-model may predict chemical composition based on features provided by the first sub-model and historical training data. The third sub-model may have a serial architecture, wherein the output of the black-box-model is input to the white-box-model. Other examples can be possible, too.

The trained model may comprise at least one sub-model, in particular a plurality of sub-models. For example, the sub-model may be a white-box-model and/or at least one of the sub-models may be a white-box-model. The trained model may comprise a plurality of sub-models, such as for at least one of the production steps and/or for at least one of the process steps and/or for at least one production line, which are white-box-models or either hybrid models or pure data-driven models. Each sub-model may be either responsible for predicting operating conditions or for providing input to other sub-models that predict the operating conditions. The trained model is built to predict controllable parameters, which are directly controllable in the real production process. Such parameters may be flagged via the meta data in a production plant layout file. The term "controllable parameter", as used herein, is a broad term and is to be given its ordinary and customary meaning to a person of ordinary skill in the art and is not to be limited to a special or customized meaning. The term specifically may refer, without limitation, to a parameter that can be set in a production process. The controllable parameters may comprise, for example, one or more of volumetric or mass flow rates, inflow composition, inflow temperature, concentrations, pressure, reactor wall temperatures.

Production by the production plant may comprise a plurality of production steps. The trained model can either represent a single production step or a group of production steps. The trained model is configured for predicting the operating conditions for a single production step or for a group of production steps. Ideally, the full process chain including each controllable element may be predicted.

The production plant may comprise at least one production line. The production plant may comprise multiple production lines. The production lines may be operated in parallel. The trained model may be configured for predicting operating conditions for a single production line or a group of production lines. For example, the production line may comprise at least one reactor and at least one solids processing unit. The trained model may be configured for predicting operating conditions for the reactor and/or the solids processing units.

As outlined above, the process chain may comprise arbitrary combinations of continuous and batch processes. The trained model may be configured to provide operating conditions relating to the best route through the process chain for achieving the quality criterion. Additionally, other criteria for determining the best route through the process chain may be considered such as an order queue or the like.

The trained model may comprise and/or cover continuous process or part of the production process, such as CIP production on a reactor for the raw CIP product. Additionally, the batch process for finishing the raw product leading to the CIP grades may be comprised in the trained model. These finishing operations may comprise, for example, milling, classifying, hydrogen annealing, coating and combinations thereof. The trained model may comprise unit operations relating to each batch process of the process chain. The unit operations may be included in the trained model as a pre-defined set of combinations depending on the industrial application and respective product properties, in particular CIP properties. Specifically, the batch process may be modelled based on the output of the trained model covering the continuous process or part of the production process which in such case may provide an intermediate quality criterion. Every batch process or route may have its own model. For each unit operation combination, a model may be trained and selected for prediction depending on the input data, in particular the customer's input.

The trained model may comprise a model for a pre-defined route through the process chain. For example, in particular for CIP production, the trained model may comprise model parts relating to the reactor and pre-defined unit operations. For example, a plurality of different pre-defined routes may exist, wherein based on the quality criterion a matching or fitting route is selected for which the operating conditions are determined. Alternatively to a pre-defined route through the process chain, at least one optimization problem may be defined based on an objective function. For example, graph theory may be used to find optimal operating conditions and the optimal combination of continuous and batch process. Thus, the best routes may be trained and may be predicted in addition to the operating conditions.

The term "control" as used herein is a broad term and is to be given its ordinary and customary meaning to a person of ordinary skill in the art and is not to be limited to a special or customized meaning. The term specifically may refer, without limitation, to determining and/or adjusting at least one parameter of the production plant. The term "monitoring" as used herein is a broad term and is to be given its ordinary and customary meaning to a person of ordinary skill in the art and is not to be limited to a special or customized meaning. The term specifically may refer, without limitation, to quantitative and/or qualitative determining at least one parameter of the production plant. The at least one parameter relates to the operating conditions of the production plant. In the control and/or monitoring step, the predicted operating conditions are provided. Specifically, the control and/or monitoring step may be based on the predicted operating conditions. The term "providing" may refer to generating at least one output, in particular to at least one controller or scheduler of the production plant. The operating conditions may be provided via at least one output channel. The production plant may be controlled according to the determined operating conditions. The operating conditions for each controllable element may be provided. The trained model may be configured for predicting controllable parameters, which are directly controllable in a real production process. Such parameters may be flagged via meta data in the production plant layout file. In particular, the reactor of the raw-CiP production process may be controlled according to the provided operating conditions to reach optimal outcome. The method may comprise using a controlling system, such as the controlling system described in more details below.

The method may comprise determining a production plan for runs of the production plant based on the determined operating conditions. The method may allow controlling the production plant by the controlling system and/or a scheduler and in particular optimal production planning. Once the customer places the order including the desired specification, optimal operating conditions may be determined with the trained model. A full production plan may be evaluated by the controlling system and/or may be passed to the scheduler, which rank the incoming production runs based, for example, on similarity in quality criteria, reactor allocation, operating conditions, prizes of raw material, urgencies, batch sizes and the like. Additionally, the controlling system and/or the scheduler may be in communication with transport planning system for logistic triggering required transportation terminals to be on site to pick-up final production batches and transport them to the customer's location. Additionally, the controlling system and/or the scheduler might be used for forecasting inventory levels based on the fully digitalized production planning.

In a further aspect of the invention, a computer program, specifically an application, for controlling and/or monitoring a production plant is proposed. The production plant comprises at least one process chain comprising at least one batch process, wherein the computer program comprises instructions which, when the program is executed by a computer or computer network, cause the computer or computer network to carry out the following steps:

i) determining of input data, wherein the input data comprises at least one quality criterion and production plant layout data, wherein the step comprises retrieving the production plant layout data and receiving information relating to the quality criterion via at least one communication interface;

ii) determining operating conditions for operating the production plant by applying at least one trained model on the input data, wherein the trained model is at least partially data-driven by being trained on sensor data from historical production runs;

iii) providing the operating conditions.

For possible definitions of most of the terms used herein, reference may be made to the description of the computer implemented method above or as described in further detail below.

Specifically, the computer program may be stored on a computer-readable data carrier and/or on a computer-readable storage medium. As used herein, the terms "computer-readable data carrier" and "computer-readable storage medium" specifically may refer to non-transitory data storage means, such as a hardware storage medium having stored thereon computer-executable instructions. The computer-readable data carrier or storage medium specifically may be or may comprise a storage medium such as a random-access memory (RAM) and/or a read-only memory (ROM).

Further disclosed and proposed herein is a computer program product having program code means, in order to perform the method according to the present invention in one or more of the embodiments disclosed herein when the program code means is executed on a computer or a computer network. Specifically, the program code means may be stored on a computer-readable data carrier and/or computer-readable storage medium.

Further disclosed and proposed herein is a data carrier having a data structure stored thereon, which, after loading into a computer or computer network, such as into a working memory or main memory of the computer or computer network, may execute the method according to one or more of the embodiments disclosed herein.

Further disclosed and purposed herein is a computer program product with program code means stored on a machine-readable carrier, in order to perform the method according to one or more of the embodiments disclosed herein, when the program code means is executed on a computer or a computer network. As used herein, a computer program product refers to the program as a tradable product. The product may generally exist in an arbitrary format, such as in a paper format, or on a computer-readable data carrier. Specifically, the computer program product may be distributed over a data network.

In a further aspect of the invention, a controlling system for controlling and/or monitoring a production plant is proposed. The production plant comprises at least one process chain comprising at least one batch process. The controlling system comprises at least one communication interface configured for determining of input data. The input data comprises at least one quality criterion and production plant layout data. The communication interface is configured for retrieving the production plant layout data and for receiving information relating to the quality criterion. The controlling system comprises at least one prediction unit configured for determining operating conditions for operating the production plant by applying at least one trained model on the input data. The trained model is at least partially data-driven by being trained on sensor data from historical production runs. The controlling system comprises at least one output device configured for providing the operating conditions.

The term "prediction unit" as used herein is a broad term and is to be given its ordinary and customary meaning to a person of ordinary skill in the art and is not to be limited to a special or customized meaning. The term specifically may refer, without limitation, to an arbitrary device adapted to perform the prediction, preferably by using at least one data processing device and, more preferably, by using at least one processor and/or at least one application-specific integrated circuit. Thus, as an example, the prediction unit may comprise one or more programmable devices such as one or more computers, application-specific integrated circuits (ASICs), Field Programmable Gate Arrays (FPGAs), or other devices which are configured for performing the above-mentioned prediction. Thus, as an example, the at least one prediction unit may comprise at least one data processing device having a software code stored thereon comprising a number of computer commands. The prediction unit may provide one or more hardware elements for performing one or more of the named operations and/or may provide one or more processors with software running thereon for performing one or more of the named operations.

The term "output device" as used herein is a broad term and is to be given its ordinary and customary meaning to a person of ordinary skill in the art and is not to be limited to a special or customized meaning. The term specifically may refer, without limitation, to a device configured for providing at least one outcome of the trained model, e.g. to at least one scheduler. The output device may comprise at least one display device.

The controlling system may comprise at least one control unit configured for controlling and/or monitoring the production plant according to the determined operating conditions. The controlling system may further comprise a scheduler unit configured for scheduling the production plant. The scheduler unit may be configured for determining a production plan for runs of the production plant based on the determined operating conditions. The controlling system may be configured for performing the method for controlling and/or monitoring a production plant according to any one of the preceding claims referring to a method. For possible definitions of most of the terms used herein, reference may be made to the description of the computer implemented method above or as described in further detail below.

Summarizing and without excluding further possible embodiments, the following embodiments may be envisaged:

Embodiment 1: A computer-implemented method for controlling and/or monitoring a production plant, wherein the production plant comprises at least one process chain comprising at least one batch process, the method comprising the following steps:
  a) at least one step of determining of input data, wherein the input data comprises at least one quality criterion and production plant layout data, wherein the step comprises retrieving the production plant layout data and receiving information relating to the quality criterion via at least one communication interface;
  b) at least one prediction step, wherein in the prediction step operating conditions for operating the production plant are determined by applying at least one trained model on the input data, wherein the trained model is at least partially data-driven by being trained on sensor data from historical production runs;
  c) at least one control and/or monitoring step, wherein the operating conditions are provided.

Embodiment 2: The method according to the preceding embodiment, wherein the production plant comprises at least two sequential processes.

Embodiment 3: The method according to any one of the preceding embodiments, wherein the production plant is controlled according to the determined operating conditions.

Embodiment 4: The method according to the preceding embodiment, wherein the operating conditions for each controllable element are provided, wherein the trained model is configured for predicting controllable parameters, which are directly controllable in a real production process.

Embodiment 5: The method according to any one of the preceding embodiments, wherein the trained model is configured for providing operating conditions relating to a best route through the processing chain for achieving the quality criterion, wherein the operating conditions determined in step b) comprise the best route through the processing chain.

Embodiment 6: The method according to any one of the preceding embodiments, wherein a production plan for runs of the production plant is determined based on the determined operating conditions.

Embodiment 7: The method according to any one of the preceding embodiments, wherein the information relating to the quality criterion comprises at least one customer specification, wherein the customer specification comprises at least one range for at least one quality parameter.

Embodiment 8: The method according to any one of the preceding embodiments, wherein the production plant layout data comprises real time data, wherein the real time data comprises information about a current state of the production plant.

Embodiment 9: The method according to any one of the preceding embodiments, wherein the production plant layout data comprises pre-defined layout parameters, wherein the pre-defined layout parameters are retrieved from at least one database via the communication interface.

Embodiment 10: The method according to any one of the preceding embodiments, wherein the production plant is configured for continuous processing.

Embodiment 11: The method according to any one of the preceding embodiments, wherein production by the production plant comprises a plurality of production steps, wherein the trained model is configured for predicting the operating conditions for a single production step or for a group of production steps.

Embodiment 12: The method according to any one of the preceding embodiments, wherein the trained model is a hybrid model.

Embodiment 13: The method according to any one of the preceding embodiments, wherein the trained model comprises at least one sub-model, wherein the sub-model is one or more of a white-box-model, a hybrid model or a data-driven model.

Embodiment 14: The method according to the preceding embodiment, wherein the trained model comprises a plurality of sub-models which are white-box-models or either hybrid models or pure data-driven models, wherein each sub-model is either responsible for predicting operating conditions or for providing input to other sub-models that predict the operating conditions.

Embodiment 15: The method according to any one of the preceding embodiments, wherein the trained model comprises a combination of a white-box-model and a black-boxmodel, wherein the white-box-model is based on physicochemical laws, wherein the black-box-model is based on the sensor data from historical production runs.

Embodiment 16: The method according to the preceding embodiment, wherein the physicochemical laws comprise one or more of chemical kinetics, conservation laws of mass, momentum and energy, particle population in arbitrary dimension.

Embodiment 17: The method according to any one of the two preceding embodiments, wherein the black-box-model is built by using one or more of machine learning, deep learning, neural networks, or other form of artificial intelligence.

Embodiment 18: The method according to any one of the three preceding embodiments, wherein the trained model comprises a serial or parallel architecture.

Embodiment 19: The method according to the preceding embodiment, wherein in the serial architecture output of the white-box-model is used as input for the black-box-model or output of the black-box-model is used as input for the white-box-model, wherein in the parallel architecture a combined output of the white-box-model and the black-box-model is determined such as by superposition of the outputs.

Embodiment 20: The method according to any one of the preceding embodiments, wherein the trained model is trained with historical data comprising one or more of quality criteria of produced powder associated with data from process control, physical reactor design, plant layout and production runs.

Embodiment 21: The method according to any one of the preceding embodiments, wherein the production plant is a powder production plant configured for producing at least one powder, wherein the powder is at least one powder selected from the group consisting of: carbonyl iron powder (CIP); iron powder; carbon black; nickel; iron; zinc oxide; titanium dioxide.

Embodiment 22: A computer program, specifically an application, for controlling and/or monitoring a production plant, wherein the production plant comprises at least one process chain comprising at least one batch process, wherein the computer program comprises instructions which, when the program is executed by a computer or computer network, cause the computer or computer network to carry out the following steps:
i) determining of input data, wherein the input data comprises at least one quality criterion and production plant layout data, wherein the step comprises retrieving the production plant layout data and receiving information relating to the quality criterion via at least one communication interface;
ii) determining operating conditions for operating the production plant by applying at least one trained model on the input data, wherein the trained model is at least partially data-driven by being trained on sensor data from historical production runs;
iii) providing the operating conditions.

Embodiment 23: A computer-implemented method for controlling and/or monitoring a production plant, wherein the production plant comprises at least one process chain comprising at least one batch process, the method comprising the following steps:
at least one step of determining of input data, wherein the input data comprises at least one quality criterion and production plant layout data, wherein the step comprises retrieving the production plant layout data and receiving information relating to the quality criterion via at least one communication interface;
at least one prediction step, wherein in the prediction step operating conditions for operating the production plant are determined by applying at least one trained model (136) on the input data, wherein the trained model is at least partially data-driven by being trained on sensor data from historical production runs;
at least one control and/or monitoring step, the operating conditions are provided,
wherein the operating conditions determined in the prediction step comprise a best route through the processing chain.

Embodiment 24: The method according to the preceding embodiment, wherein the method comprises controlling and/or monitoring a production plant according to a method for controlling and/or monitoring according to any one of embodiments 1 to 21.

Embodiment 25: A controlling system for controlling and/or monitoring a production plant, wherein the production plant comprises at least one process chain comprising at least one batch process, wherein the controlling system comprises at least one communication interface configured for determining of input data, wherein the input data comprises at least one quality criterion and production plant layout data, wherein the communication interface is configured for retrieving the production plant layout data and for receiving information relating to the quality criterion, wherein the controlling system comprises at least one prediction unit configured for determining operating conditions for operating the production plant by applying at least one trained model on the input data, wherein the trained model is at least partially data-driven by being trained on sensor data from historical production runs, wherein the controlling system comprises at least one output device configured for providing the operating conditions.

Embodiment 26: The controlling system according to the preceding embodiment, wherein the controlling system comprises at least one control unit configured for controlling and/or monitoring the production plant according to the determined operating conditions.

Embodiment 27: The controlling system according to the preceding embodiment, wherein the controlling system further comprises a scheduler unit configured for scheduling the production plant, wherein the scheduler unit is configured for determining a production plan for runs of the production plant based on the determined operating conditions.

Embodiment 28: The controlling system according to any one of the three preceding embodiments, wherein the controlling system is configured for performing the method for controlling and/or monitoring a production plant according to any one of the preceding embodiments referring to a method.

SHORT DESCRIPTION OF THE FIGURES

Further optional features and embodiments will be disclosed in more detail in the subsequent description of embodiments, preferably in conjunction with the dependent claims. Therein, the respective optional features may be realized in an isolated fashion as well as in any arbitrary feasible combination, as the skilled person will realize. The scope of the invention is not restricted by the preferred embodiments. The embodiments are schematically depicted in the Figures. Therein, identical reference numbers in these Figures refer to identical or functionally comparable elements.

DETAILED DESCRIPTION OF THE EMBODIMENTS

Figure 1:
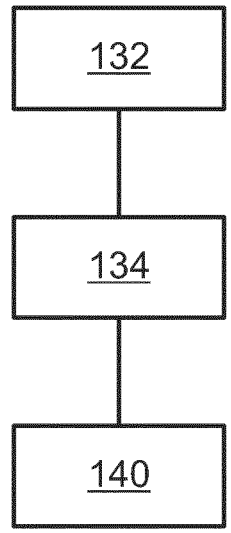
FIG. 1 shows an embodiment of an exemplary method according to the present invention.

FIG. 1 shows an embodiment of an exemplary computer-implemented method for controlling and/or monitoring a production plant 110 according to the present invention.

Figure 2A:
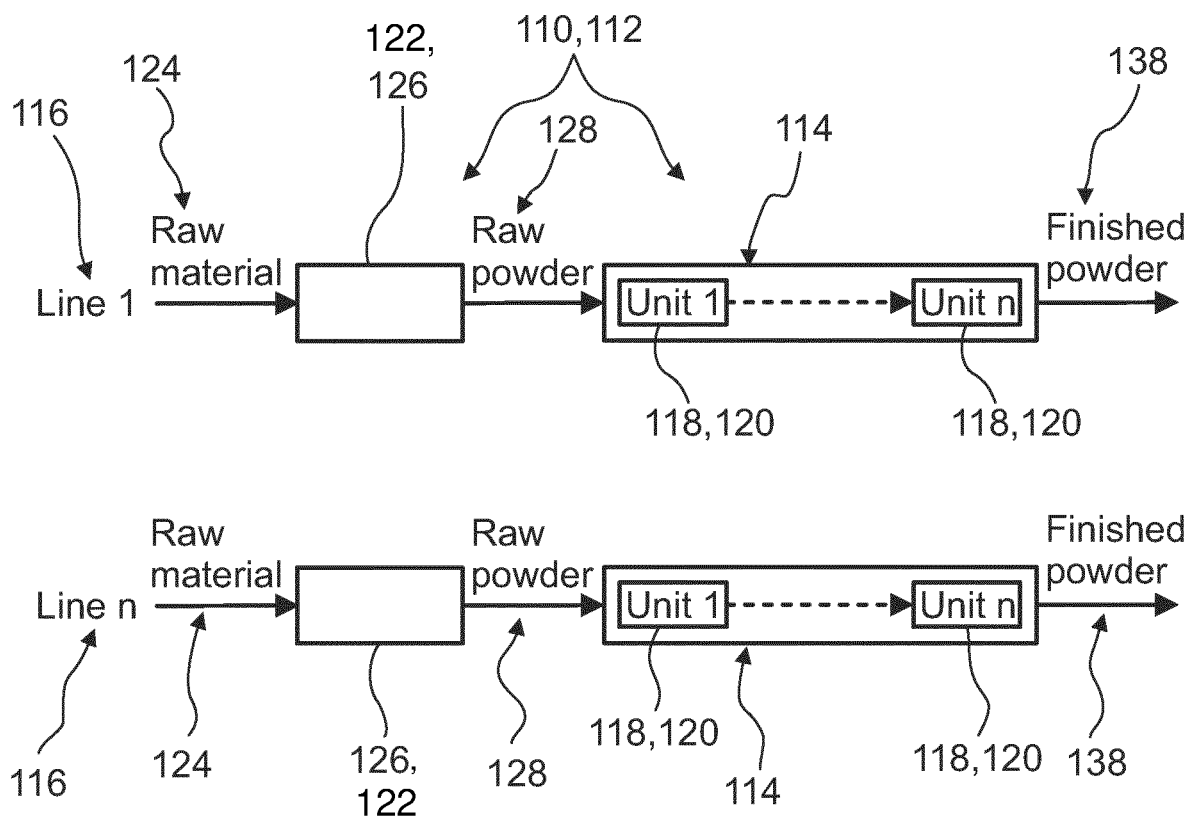
FIGS. 2A and 2B show embodiments of a production plant.
Figure 2B:
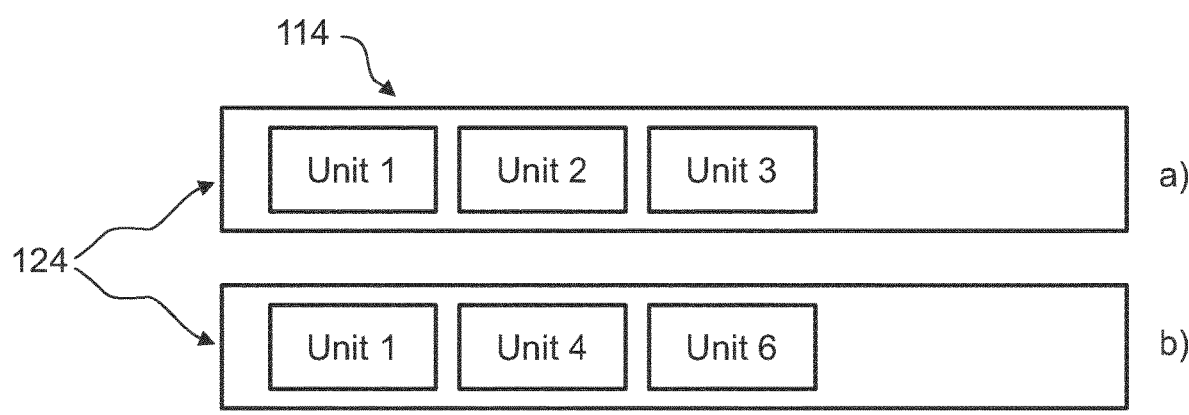

FIGS. 2A and 2B show exemplary embodiments of a production plant 110. The production plant 110 may be a chemical production plant. In particular, the production plant 110 may be a powder production plant configured for producing at least one powder. The production plant 110 comprises at least one process chain 112 comprising at least one batch process 114. The process chain 112 may comprise a sequence of processes or production steps performed in at least one processing unit or in a plurality of processing units. The process chain 112 may comprise steps or processes which may be performed simultaneously and/or steps or processes which may be performed successively. The process chain 112 may comprise at least one production line 116. The process chain 112 may comprise multiple production lines, in particular multiple production lines, which can be operated in parallel. As shown in FIG. 2A, the process chain 112 may comprise n production lines 116, denoted with "Line 1" to "Line n", with n being a positive integer. In the embodiment shown in FIG. 2A the production lines 116 are operated in parallel.

The batch process 114 may comprise processing units which may be arranged in chronological order and directly related to the production process. The process chain 112 may comprise multiple batch processes 114. The batch process 114 may be configured to control at least one property of the product. The batch process 114 may comprise at least one mechanical and/or at least one thermal and/or at least one chemical process. The batch process 114 may comprise processing unit operations 118, also denoted finishing operations, comprising one or more of milling, mixing, sieving, screening, hydrogen annealing, coating and combinations thereof. The production plant 110 may comprise at least one unit 120 selected from the group consisting of: at least one mill, at least one screen, at least one sieve, at least one oven, at least one calciner, at least one rotary kiln, at least one fluidized bed. As shown in FIG. 2A, the process chain 112, in particular each of the production lines 116, may comprise n units 120, denoted with "unit 1" to "unit n", with n being a positive integer.

The process chain 112 may comprise at least one continuous process 122. The process chain 112 may comprise batch processes 114 and continuous processes 122. The process chain 112 may comprise semi-continuous and/or semi-batch processes. For example, the process chain 112 may comprise at least one continuous process 122 and a plurality of batch processes 114. The production plant 110 may be configured for continuous processing and/or batch processing. The production plant 110 may comprise a plurality of parallel continuous processes 122 and/or batch processes 114. The continuous processes 122 and/or batch processes 114 may be combined in different ways. The combination of continuous processes 122 and batch processes 114 may depend on at least one criterion such as a quality for the product. The combination of continuous processes 122 and batch processes 114 may be selected to take the best route through the process chain 112 based on the quality criterion. Additionally, other criteria may be possible such as an order queue or the like.

The operating conditions determined in step b) may comprise information about a best route. The route may be a combination of unit operations and/or a combination of processing units and/or a combination of processes or production steps, in particular comprising continuous and/or batch processes, performed and/or passed during the production process in the production plant. The best route may be an optimal route through the production plant in terms of the at least one quality criterion. Thus, the optimal route, specifically, may be a route selected from a plurality of possible routes which maximizes or minimizes the at least one quality criterion. The best route may be a target route and/or final route and/or planned route. For example, the batch process may comprise different routes through the production plant depending on the quality criterion and/or workload of the production plant. Different processing unit operations may be combined for reaching and/or ensuring an optimum in terms of the at least one quality criterion. FIG. 2B shows an embodiment with two possible routes a) and b) which differ in the combination of units 1 to 6. The best route may be selected depending on the desired chemical product, specifically its quality criterion.

For example, the production plant 110 may be a powder production plant configured for producing at least one powder. The powder may be a nano-sized powder, e.g. with particle sizes from 1 to 100 nm, or a micro-sized powder, e.g. with particle sizes from 0.1 to 10 µm. The powder may be at least one powder selected from the group consisting of: carbonyl iron powder (CIP); iron powder; carbon black; nickel; iron; zinc oxide; titanium dioxide.

For example, as shown in FIG. 2A, the production plant 110 may be a powder production plant for production of carbonyl iron powder (CIP). Carbonyl iron powder may be produced for various industrial applications such as for metal injection molding, coil cores, radar absorption, diamond tools and the like. CIP is a high purity micro-sized iron powder. CIP can be produced by thermal decomposition of iron pentacarbonyl. CIP may be produced via a hot-wall aerosol process, in which gaseous iron pentacarbonyl (IPC) is decomposed into Fe and CO. The production plant 110 may comprise at least one evaporator or may be connected to at least one evaporator. In FIG. 2A the inflow of iron pentacarbonyl is denoted as raw material and reference number 124. The production plant 110 may comprise at least one reactor 126. The reactor 126 may be or may be part of the continuous process 122 of the process chain 112. Liquid iron pentacarbonyl (IPC), which may be produced in a separate cabonylation-plant or an upstream process step, may be fed to the evaporator, where the liquid is heated up to about 104° C. IPC boils and the generated pure gas may be fed to the reactor 126. The reactor 126 may be a cylindrical reactor with a certain length and diameter. The reactor 126 may be wall-heated up to 550° C. IPC is decomposed quantitatively to iron and 5 moles CO-gas in an endothermic reaction. The temperature in the reaction zone is typically between 250° C. and 350° C. The Fe-particles formed in the gas phase may be µm-sized spherical particles.

Raw-CIP, denoted as "raw powder" and reference number 128 in FIG. 2A, may be further processed in at least one batch process 114 to produce a finished product, denoted as "finished powder" and reference number 138 in FIG. 2A. For example, the raw-CIP 128 may be fed into containers and may be processed afterwards in differing batch processes 114 according to the requirements of the desired and/or planned and/or wanted finished product. The production plant 110 may be configured for producing different kind of finished CIP, so-called grades. The grades may be produced on multiple production lines 116. The grades may depend on application specific properties and quality criteria. The quality criteria may be specified by the industrial application of the CIP. The quality criteria may be defined in order to guarantee proper functioning for the application. Properties of the finished CIP product, denoted as "Finished powder" and reference number 138 in FIG. 2A, may comprise one or more of particle size distribution, morphology, degree of agglomeration, surface chemistry, and phase composition. The properties of the finished CIP product, i.e. the outcome of the process chain 112, may be controlled by subsequent solid processing unit operations comprising one or more of milling, mixing, sieving, screening, hydrogen annealing, coating and combinations thereof. The production plant 110 may comprise at least one unit selected from the group consisting of: at least one mill, at least one screen, at least one sieve, at least one oven, at least one calciner, at least one rotary kiln, at least one fluidized bed. The raw-CIP properties may be modified by mechanical and/or thermal and/or chemical processes. The milling may comprise destroying agglomerates and/or aggregates. The mixing may comprise homogenizing larger batches. The sieving may comprise fine-tuning of the particle size distribution. The subsequent adjustment of the properties may require a lot of corporate know-how and/or manual batch manipulations.

Referring back to FIG. 1, the method comprises the following steps:
a) at least one step of determining of input data (denoted with reference number 132), wherein the input data comprises at least one quality criterion and production plant layout data, wherein the step comprises retrieving the production plant layout data and receiving information relating to the quality criterion via at least one communication interface (158);
b) at least one prediction step (denoted with reference number 134), wherein in the prediction step operating conditions for operating the production plant 110 are determined by applying at least one trained model 136 on the input data, wherein the trained model 136 is at least partially data-driven by being trained on sensor data from historical production runs;
c) at least one control and/or monitoring step, (denoted with reference number 140) wherein the operating conditions are provided.

The quality criterion may be an application dependent quality criterion. The quality criterion may comprise one or more of particle size distribution, morphology, degree of agglomeration, surface chemistry, and phase composition. The quality criterion may comprise at least one customer specification. The customer specification may comprise at least one range for at least one quality parameter. Based on the quality parameter the further processing along a customer value chain can be conducted. The trained model 136 may be configured to provide operating conditions relating to the best route through the processing chain 512 for achieving the quality criterion. Some of the input parameters may be provided by the customer. Others may be determined based on customer input. For example, the customer may specify the industrial application and specifications relevant for such application. Additional input parameters regarding the product properties may be calculated or retrieved from a data base.

The information about the production plant 110 may be information about a design of the production plant and/or status such as in operation, in maintenance, maintenance planed, current operation status e.g. degradation status. The design may comprise parameters specifying the physical reactor design at hand such as the reactor geometry, number of reactors, plant layout such as continuous process or batch process. The production plant layout data may comprise real time data. The real time data may comprise information about a current state of the production plant. The production plant layout data may comprise pre-defined layout parameters. The pre-defined layout parameters may be retrieved from at least one database via the communication interface. The database may comprise the at least one data storage device with the information stored therein. In particular, the database may contain an arbitrary collection of information. The database may be or may comprise at least one database selected from the group consisting of: at least one server, at least one server system comprising a plurality of servers, at least one cloud server or cloud computing infrastructure. The database may comprise at least one storage unit configured to store data.

The prediction, in particular, may be an expected value of at least one operating condition for fulfilling the quality criterion. The trained model 136 may be configured for predicting optimal production process conditions that yield required application-specific product properties, in particular powder properties.

The operating conditions may comprise operating conditions for continuous processing units such as one or more of volumetric or mass flow rates, inflow composition, inflow temperature, concentrations, pressure, reactor wall temperatures, reactor geometry, reactor size. The operating conditions may comprise operating conditions for batch processing units such as one or more of residence time, pressure, volumetric or mass flow rates, inflow composition, inflow temperature, concentrations, wall temperatures, dosing recipe, reactor geometry, reactor size.

The trained model 136 is at least partially data-driven by being trained on sensor data from historical production runs. Specifically, the data driven model is derived from analysis of experimental data. The data driven model may be a machine-learning tool. The trained model 136 may be trained with historical data comprising one or more of quality criteria of produced powder associated with data from process control, physical reactor design, plant layout and production runs. The sensor data may comprise data from at least one temperature sensor, volumetric or mass flow rate sensor, pressure sensor, particle count sensor, weight sensor.

Figure 3:
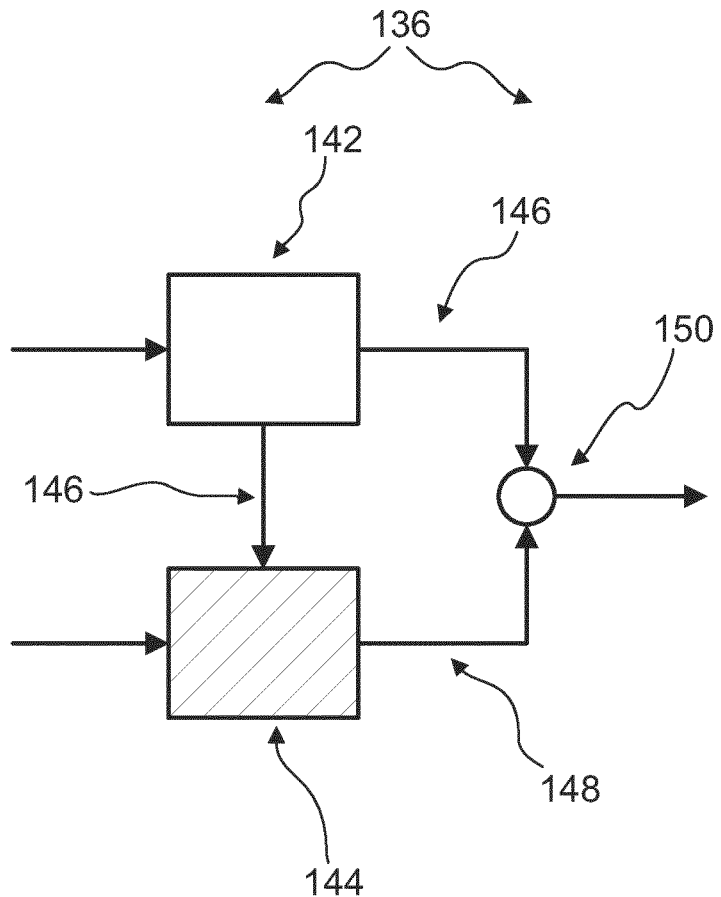
FIG. 3 shows an embodiment of a trained model according to the present invention.
Figure 4:
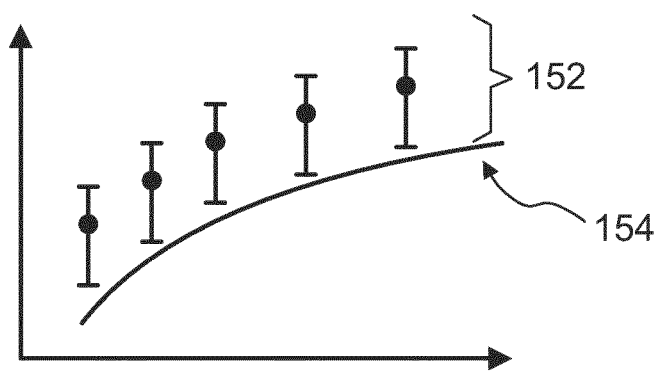
FIG. 4 shows composition of the trained model.

The trained model 136 may be a hybrid model. FIG. 3 shows an embodiment of a trained model 136 according to the present invention. A hybrid model may refer to a model that comprises first-principles parts, so called white box, as well as data-driven parts, so called black box, see e.g. review paper of Moritz von Stoch et al.: "Hybrid semi-parametric modeling in process systems engineering: Past, present and future", 2014, Computers & Chemical Engineering, pergamon press, Oxford, GB, vol. 60, 31 Aug. 2013, pages 86 to 101 XP028792356, ISSN: 0098-1354, DOI: 10.1016/J.COMPCHEMENG.2013.08.008. The trained model 136 may comprise a combination of a white-box-model 142 and a black-box-model 144. The white-boxmodel 142 may be based on physico-chemical laws. The physico-chemical laws may comprise one or more of chemical kinetics, conservation laws of mass, momentum and energy, particle population in arbitrary dimension. The white-box-model may be selected according to the physico-chemical laws that govern the respective process step. The black-box-model 144 may be based on sensor data from historical production runs. The black-box-model 144 may be built by using one or more of machine learning, deep learning, neural networks, or other form of artificial intelligence. The black-box-model 144 may be any model that yields a good fit between training and test data. FIG. 4 shows composition of an embodiment of the trained model 136. In particular, experimental data based on which the data-driven model is generated and theoretical data based on which the white-box-model 142 is generated are shown.

The trained model 136 may comprise a serial or parallel architecture. In the serial architecture output 146 of the white-box-model 142 is used as input for the black-box-model 144 or output 148 of the black-box-model 144 is used as input for the white-box-model 142. In the parallel architecture a combined output 150 of the white-box-model 142 and the black-box-model 144 is determined such as by superposition of the outputs 146, 148. For further details of serial and parallel architecture reference is made to the review paper of Moritz von Stoch et al.: "Hybrid semi-parametric modeling in process systems engineering: Past, present and future", 2014, Computers & Chemical Engineering, pergamon press, Oxford, GB, vol. 60, 31 Aug. 2013, pages 86 to 101 XP028792356, ISSN: 0098-1354, DOI: 10.1016/J.COMPCHEMENG.2013.08.008. FIG. 3 shows embodiments of a serial architecture, wherein a combined output of the white-box-model and the black-box-model is calculated in addition.

The trained model 136 may comprise at least one sub-model, in particular a plurality of submodels. For example, the sub-model may be a white-box-model and/or at least one of the submodels may be a white-box-model. The trained model 136 may comprise a plurality of sub-models, such as for at least one of the production steps and/or for at least one of the process steps and/or for at least one production line 116, which are white-box-models or either hybrid models or pure data-driven models. Each sub-model may be either responsible for predicting operating conditions or for providing input to other sub-models that predict the operating conditions. The trained model 136 is built to predict controllable parameters, which are directly controllable in the real production process. Such parameters may be flagged via the meta data in a production plant layout file.

Production by the production plant 110 may comprise a plurality of production steps. The trained model 136 can either represent a single production step or a group of production steps. The trained model 136 is configured for predicting the operating conditions for a single production step or for a group of production steps. Ideally, the full process chain including each controllable element may be predicted. The trained model 136 may be configured for predicting operating conditions for a single production line 116 or a group of production lines 116. For example, the production line 116 may comprise at least one reactor 126 and at least one processing unit 120. The trained model 136 may be configured for predicting operating conditions for the reactor and/or the solids processing units 120.

As outlined above, the process chain 112 may comprise arbitrary combinations of continuous and patch processes. The trained model 132 may be configured to provide operating conditions relating to the best route through the process chain 116 for achieving the quality criterion. Additionally, other criteria for determining the best route through the processing chain may be considered such as an order queue or the like. The trained model 136 may comprise and/or cover continuous process 122 or part of the production process, such as CIP production on a reactor for the raw CIP product. Additionally, the batch process 114 for finishing the raw product leading to the CIP grades may be comprised in the trained model 136. These finishing operations may comprise, for example, milling, classifying, hydrogen annealing, coating and combinations thereof. The trained model 136 may comprise unit operations 118 relating to each batch process 114 of the process chain 112. The unit operations 118 may be included in the trained model 136 as a pre-defined set of combinations depending on the industrial application and respective product properties, in particular CIP properties. Specifically, the batch process 114 may be modelled based on the output of the trained model 136 covering the continuous process 122 or part of the production process which in such case may provide an intermediate quality criterion. Every batch process 114 or route may have its own model. For each unit operation 118 combination, a model may be trained and selected for prediction depending on the input data, in particular the customer's input.

The trained model 136 may comprise a model for a pre-defined route through the process chain 112. For example, in particular for CIP production, the trained model 136 may comprise model parts relating to the reactor and pre-defined unit operations. For example, a plurality of different pre-defined routes may exist, wherein based on the quality criterion a matching or fitting route is selected for which the operating conditions are determined. Alternatively to a pre-defined route through the process chain 112, at least one optimization problem may be defined based on an objective function. For example, graph theory may be used to find optimal operating conditions and the optimal combination of continuous process 122 and batch process 114. Thus, the best routes may be trained and may be predicted in addition to the operating conditions. The batch process 114 may comprise different routes through the production plant 110 depending on the quality criterion and/or workload of the production plant 110. For example, for the production lines 116 of FIG. 2A, unit operations 118 and units 120 may be combined such that it is possible to reach and/or ensure an optimum in terms of the at least one quality criterion.

As further shown in FIG. 2A, the production plant 110 may be controlled by a controlling system 156. The controlling system 156 comprises at least one communication interface 158 configured for determining of input data. The communication interface 158 is configured for retrieving the production plant layout data and for receiving information relating to the quality criterion. The controlling system 156 comprises at least one prediction unit 160 configured for determining operating conditions for operating the production plant 110 by applying at least one trained model 136 on the input data. The controlling system 156 comprises at least one output device 162 configured for providing the operating conditions.

The production plant 110 may be controlled according to the determined operating conditions. The operating conditions for each controllable element may be provided. The trained model 136 may be configured for predicting controllable parameters, which are directly controllable in a real production process. Such parameters may be flagged via meta data in the production plant layout file. In particular, the reactor 126 of the raw-CiP production process may be controlled according to the provided operating conditions to reach optimal outcome.

The method may comprise determining a production plan for runs of the production plant 110 based on the determined operating conditions. The method may allow controlling the production plant by the controlling system 156 and/or a scheduler and in particular optimal production planning. Once the customer places the order including the desired specification, optimal operating conditions may be determined with the trained model 136. A full production plan may be evaluated by the controlling system 156 and/or may be passed to the scheduler, which rank the incoming production runs based, for example, on similarity in quality criteria, reactor allocation, operating conditions, prizes of raw material, urgencies, batch sizes and the like. Additionally, controlling system 156 and/or the scheduler may be in communication with transport planning system for logistic triggering required transportation terminals to be on site to pick-up final production batches and transport them to the customer's location. Additionally, the controlling system 156 and/or the scheduler might be used for forecasting inventory levels based on the fully digitalized production planning.

In another example the method may be applied in polyurethane production plants, in particular for producing thermoplastic polyurethane (TPU) or expanded thermoplastic polyurethane (ETPU).

Turning again to FIG. 1 a further implementation of the computer implemented method for monitoring and/or controlling of a production plant 110 according to the present invention is shown.

Figure 5A:
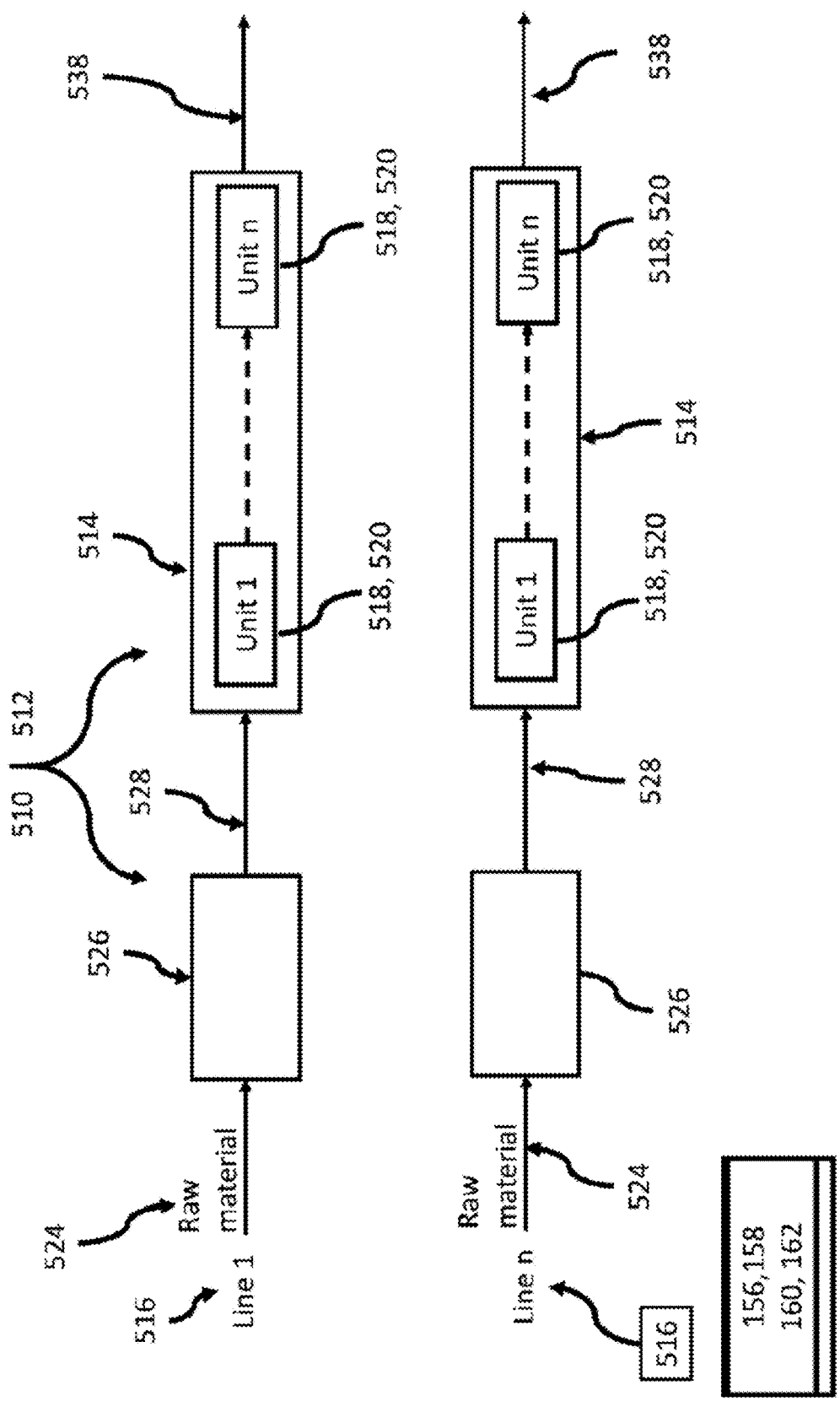
FIGS. 5A and 5B show for the embodiments of a production plant.
Figure 5B:
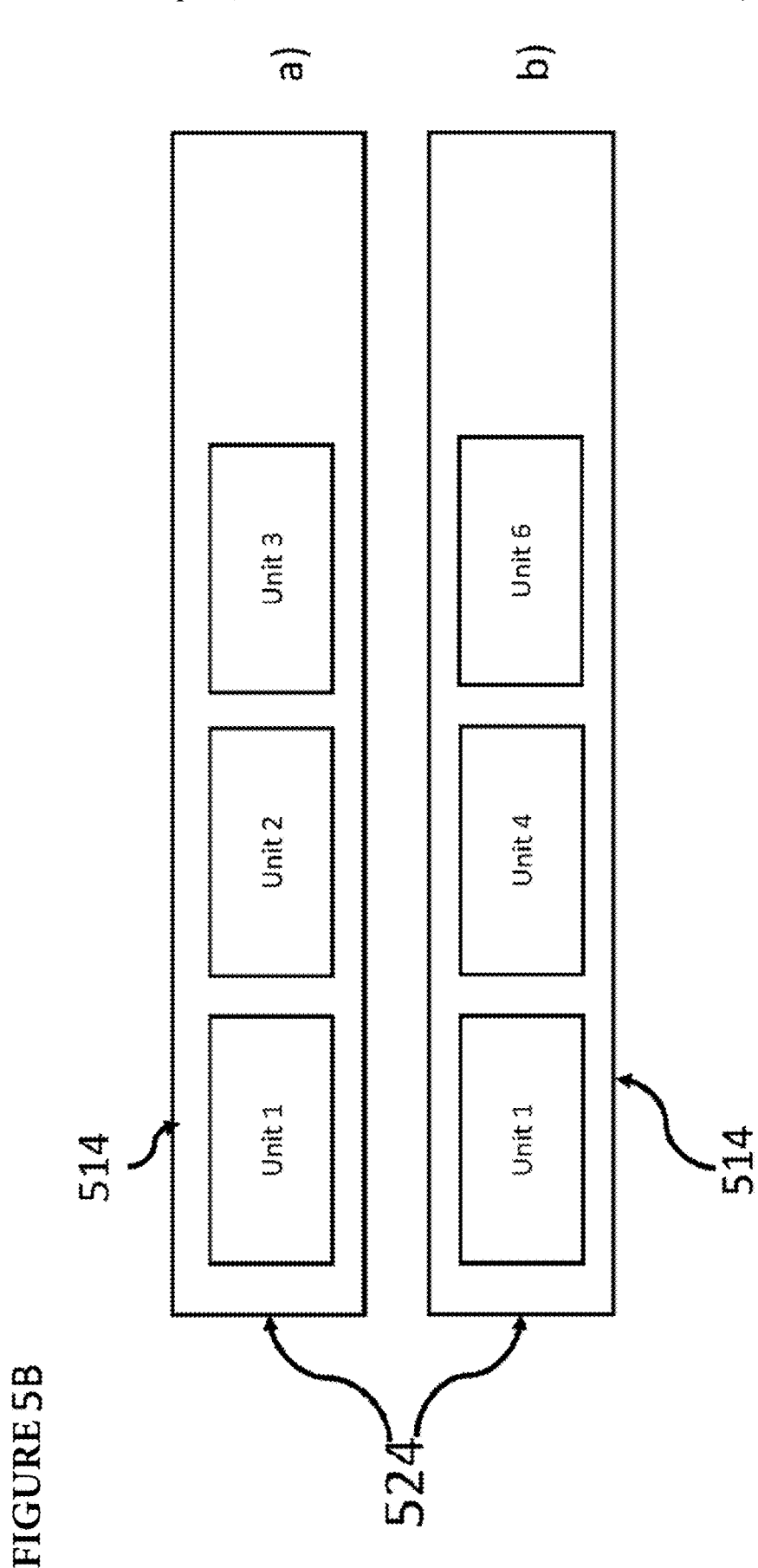

FIGS. 5A and 5B show exemplary embodiments of a production plant 510. The production plant 510 may be a chemical production plant. In particular, the production plant 510 may be a polyurethane production plant configured for producing at least one polyurethane more particular one TPU and/or one ETPU. The production plant 510 comprises at least one process chain 512 comprising at least one batch process 514. The process chain 512 may comprise a sequence of processes or production steps performed in at least one processing unit or in a plurality of processing units. The process chain 512 may comprise steps or processes which may be performed simultaneously and/or steps or processes which may be performed successively. The process chain 512 may comprise at least one production line 516. The process chain 512 may comprise multiple production lines, in particular multiple production lines, which can be operated in parallel. As shown in FIG. 5A, the process chain 512 may comprise n production lines 516, denoted with "Line 1" to "Line n", with n being a positive integer. In the embodiment shown in FIG. 5A the production lines 516 are operated in parallel.

The batch process 514 may comprise processing units which may be arranged in chronological order and directly related to the production process. The process chain 512 may comprise multiple batch processes 514. The batch process 514 may be configured to control at least one property of the product. The batch process 514 may comprise at least one mechanical and/or at least one thermal and/or at least one chemical process. The batch process 514 may comprise processing unit operations 518, also denoted finishing operations, comprising one or more of extruding, feeding mixing, blowing, coloring. The production plant 510 may comprise at least one unit 520 selected from the group consisting of: at least one extruder, at least one injector, at least one perforated plate, autoclave. As shown in FIG. 5A, the process chain 512, in particular each of the production lines 516, may comprise n units 520, denoted with "unit 1" to "unit n", with n being a positive integer.

The process chain 512 may comprise at least one continuous process 522. The process chain 512 may comprise batch processes 514 and continuous processes 522. The process chain 512 may comprise semi-continuous and/or semi-batch processes. For example, the process chain 512 may comprise at least one continuous process 522 and a plurality of batch processes 514. The production plant 510 may be configured for continuous processing and/or batch processing. The production plant 510 may comprise a plurality of parallel continuous processes 522 and/or batch processes 514.

The continuous processes 522 and/or batch processes 514 may be combined in different ways. The combination of continuous processes 522 and batch processes 514 may depend on at least one criterion such as a quality for the product. The combination of continuous processes 522 and batch processes 514 may be selected to take the best route through the process chain 512 based on the quality criterion. Additionally, other criteria may be possible such as an order queue or the like.

The operating conditions determined in step b) may comprise information about a best route. The route may be a combination of unit operations and/or a combination of processing units and/or a combination of processes or production steps, in particular comprising continuous and/or batch processes, performed and/or passed during the production process in the production plant. The best route may be an optimal route through the production plant in terms of the at least one quality criterion. Thus, the optimal route, specifically, may be a route selected from a plurality of possible routes which maximizes or minimizes the at least one quality criterion. The best route may be a target route and/or final route and/or planned route. For example, the batch process may comprise different routes through the production plant depending on the quality criterion and/or workload of the production plant. Different processing unit operations may be combined for reaching and/or ensuring an optimum in terms of the at least one quality criterion. FIG. 5B shows an embodiment with two possible routes a) and b) which differ in the combination of units 1 to 6. The best route may be selected depending on the desired chemical product, specifically its quality criterion.

For example, the production plant 510 may be a polyurethane production plant configured for producing at least one polyurethane more particular one TPU and/or one ETPU.

For example, as shown in FIG. 5A, the production plant 510 may be a polyurethane production plant for production polyurethane, in particular of TPU and/or ETPU. TPU and ETPU may be produced for various industrial applications for example foams, insulation material, shoe soles, cases, dependent on these various industrial applications different properties may be required. In the sense of this application these properties may be quality criteria.

ETPU can be produced from TPU by expanding TPU. In FIG. 5A the inflow prepolymers of a TPU production is denoted as raw material and reference number 524. The production plant 510 may comprise at least one reactor 526. The reactor 526 may be or may be part of the continuous process 522 of the process chain 112. The reactor may be a rector for a polymerization process for producing a TPU.

Reference number 528 in FIG. 5A, denotes the TPU and may be further processed in at least one batch process 114 to produce a finished product, denoted as reference number 538 in FIG. 5A. For example, the TPU 528 may be fed into containers and may be processed afterwards in differing batch processes 514 according to the requirements of the desired and/or planned and/or wanted finished product. The production plant 510 may be configured for producing different kind of end products. The end products may be produced on multiple production lines 516. The end products may depend on application specific properties and quality criteria. The quality criteria may be specified by the industrial application of the end product. The quality criteria may be defined in order to guarantee proper functioning for the application. Properties of the finished end product, denoted as reference number 538 in FIG. 5A, may comprise one or more of particle size distribution, morphology, degree of hardness, pore size and phase composition. The properties of the finished end product, i.e. the outcome of the process chain 512, may be controlled by subsequent processing unit operations. The TPU properties may be modified by mechanical and/or thermal and/or chemical processes. The TPU may be milled such that in a following melting process the melting may be more evenly. The mixing may comprise homogenizing larger batches. Sieving may comprise fine-tuning of the particle size distribution. The subsequent adjustment of the properties may require a lot of corporate know-how and/or manual batch manipulations.

As a non-limiting example, "TPU" may be produced in process 522, for example, at the upstream industrial plant using an upstream production process and input material in the form of:

Isocyanate: 4,4'-methylene diphenyl diisocyanate (MDI)
Chain extender: 1,4-butanediol
Polyol: poly tetrahydrofuran (PolyTHF)

Further additives such as catalysts, stabilizers and/or antioxidants may be added in dependent upon the specifics of the upstream industrial process. Any other suitable process for producing TPU and/or ETPU may be used.

TPU production may involve carrying out in a twin-screw extruder, ZSK58 MC, of the company Coperion with a process length of 48D (12 housings). The discharge of the melt (polymer melt) from the extruder may be carried out by means of a gear pump. After the melt filtration, the polymer melt may be processed into granules by means of underwater granulation, which may be dried continuously in a heating vortex bed, at 40-90° C. The polyol, the chain extender and the diisocyanate as well as a catalyst may be dosed into the first zone. The addition of further additives, as described above, takes place in Zone 8. The housing temperatures range from 150 to 230° C. The melting and underwater-granulation may be carried out with melting temperatures of 210-230° C. The screw speed may be between 180 and 240 rpm. The throughput may range from 180 to 220 kg/h. There may or may not be additional production steps than shown in this example for the TPU production.

Examples of batch or semi batch processes for production of ETPU may be

As a further non-limiting example, ETPU production, or production of the expanded particles (foamed granules) from the TPU, may involve, a twin-screw extruder with a screw diameter of 44 mm and a ratio of length to diameter of 42 being used with subsequent melting pump, a start-up valve with screen changer, a perforated plate and an underwater granulation. The thermoplastic polyurethane being dried before processing at 80° C. for 3 h in order to obtain a residual moisture of less than 0.02 wt. %. The TPU used may be dosed via a gravimetric dosing device into the feed of the twin-screw extruder. After dosing the materials into the feed of the twin-screw extruder, the materials may be melted and mixed. Subsequently, the propellants $CO_2$ and $N_2$ may be added via one injector each. The remaining extruder length may be used for homogeneous incorporation of the propellant into the polymer melt. After the extruder, the polymer/propellant mixture may be pressed into a perforated plate by means of a gear pump via a start-up valve with screen changer into a perforated plate. Via the perforated plate individual strands may be produced. These strands may be conveyed to the pressurized cutting chamber of the underwater granulation unit, in which the strands may be cut into granules and further transported with the water while the granules are expanded. The separation of the expanded particles or granules from the process water may be done by means of a centrifugal dryer. The total throughput of the extruder, polymers and propellants may be 40 kg/h. After the separation of the expanded granules from the water by means of a centrifugal dryer, the expanded granules may be dried at 60° C. for 3 h to remove the remaining surface water as well as possible moisture in the particle in order to not distort a further analysis of the particles. The ETPU production according to this process may be considered as one unit, for example Unit 1

In addition to processing in the extruder, expanded particles may also be produced in an autoclave. For this purpose, the pressure vessel may be filled with a filling degree of 80% with the solid/liquid phase, wherein the phase ratio is 0.32. Solid phase here is the TPU and the liquid phase a mixture of water with calcium carbonate and a surface-active substance. With pressure onto this solid/liquid phase, the blowing agent/propellant (butane) may be pressed into the tight pressure vessel, which is previously rinsed with nitrogen. The pressure vessel may be heated by stirring the solid/liquid phase at a temperature of 50° C. and then nitrogen may be pressed into the pressure vessel up to a pressure of 8 bar. Subsequently, further heating may be carried out until the desired impregnation temperature is reached. When the impregnation temperature and the impregnation pressure are reached, the pressure vessel may be relaxed via a valve after a given holding time. The ETPU production according to this process may be considered as one unit, for example Unit 2.

There may or may not be additional production steps than shown in this example for the ETPU production.

The TPU production process and/or the ETPU production processes may or may not be the same as shown in the above representative examples. Those skilled in the art shall appreciate that a specific production process is not limiting to the scope or generality of the present teachings.

The TPU may be colored with pigments in a further batch process represented by a different unit.

Referring back to FIG. 1, the method comprises the following steps:

a) at least one step of determining of input data (denoted with reference number 132), wherein the input data comprises at least one quality criterion and production plant layout data, wherein the step comprises retrieving the production plant layout data and receiving information relating to the quality criterion via at least one communication interface (158);

b) at least one prediction step (denoted with reference number 134), wherein in the prediction step operating conditions for operating the production plant 110 are determined by applying at least one trained model 136 on the input data, wherein the trained model 136 is at least partially data-driven by being trained on sensor data from historical production runs;

c) at least one control and/or monitoring step, (denoted with reference number 140) wherein the operating conditions are provided.

The quality criterion may be an application dependent quality criterion. The quality criterion may comprise one or more of particle size distribution, morphology, degree of hardness, pore size and phase composition. The quality criterion may comprise at least one customer specification. The customer specification may comprise at least one range for at least one quality parameter. Based on the quality parameter the further processing along a customer value chain can be conducted. The trained model 136 may be fed with the input data, in particular input parameters, relating to the quality criteria. Some of the input parameters may be provided by the customer. Others may be determined based on customer input. For example, the customer may specify the industrial application and specifications relevant for such application. Additional input parameters regarding the product properties may be calculated or retrieved from a data base.

The information about the production plant 510 may be information about a design of the production plant and/or status such as in operation, in maintenance, maintenance planed, current operation status e.g. degradation status. The design may comprise parameters specifying the physical reactor design at hand such as the reactor geometry, number of reactors, plant layout such as continuous process or batch process. The production plant layout data may comprise real time data. The real time data may comprise information about a current state of the production plant. The production plant layout data may comprise pre-defined layout parameters. The pre-defined layout parameters may be retrieved from at least one database via the communication interface. The database may comprise the at least one data storage device with the information stored therein. In particular, the database may contain an arbitrary collection of information. The database may be or may comprise at least one database selected from the group consisting of: at least one server, at least one server system comprising a plurality of servers, at least one cloud server or cloud computing infrastructure. The database may comprise at least one storage unit configured to store data.

The prediction, in particular, may be an expected value of at least one operating condition for fulfilling the quality criterion. The trained model 136 may be configured for predicting optimal production process conditions that yield required application-specific product properties.

The operating conditions may comprise operating conditions for continuous processing units such as one or more of volumetric or mass flow rates, inflow composition, inflow temperature, concentrations, pressure, reactor wall temperatures, reactor geometry, reactor size. The operating conditions may comprise operating conditions for batch processing units such as one or more of residence time, pressure, volumetric or mass flow rates, inflow composition, inflow temperature, concentrations, wall temperatures, dosing recipe, reactor geometry, reactor size.

The trained model 136 is at least partially data-driven by being trained on sensor data from historical production runs. Specifically, the data driven model is derived from analysis of experimental data. The data driven model may be a machine-learning tool. The trained model 136 may be trained with historical data comprising one or more of quality criteria of produced polyurethane associated with data from process control, physical reactor design, plant layout and production runs. The sensor data may comprise data from at least one temperature sensor, volumetric or mass flow rate sensor, pressure sensor, particle count sensor, weight sensor.

The trained model 136 may be a hybrid model. FIG. 3 shows an embodiment of a trained model 136 according to the present invention. A hybrid model may refer to a model that comprises first-principles parts, so called white box, as well as data-driven parts, so called black box, see e.g. review paper of Moritz von Stoch et al.: "Hybrid semi-parametric modeling in process systems engineering: Past, present and future", 2014, Computers & Chemical Engineering, pergamon press, Oxford, GB, vol. 60, 31 Aug. 2013, pages 86 to 101 XP028792356, ISSN: 0098-1354, DOI: 10.1016/J.COMPCHEMENG.2013.08.008. The trained model 136 may comprise a combination of a white-box-model 142 and a black-box-model 144. The white-box-model 142 may be based on physico-chemical laws. The physico-chemical laws may comprise one or more of chemical kinetics, conservation laws of mass, momentum and energy, particle population in arbitrary dimension. The white-box-model may be selected according to the physico-chemical laws that govern the respective process step. The black-box-model 144 may be based on sensor data from historical production runs. The black-box-model 144 may be built by using one or more of machine learning, deep learning, neural networks, or other form of artificial intelligence. The black-box-model 144 may be any model that yields a good fit between training and test data. FIG. 4 shows composition of an embodiment of the trained model 136. In particular, experimental data based on which the data-driven model is generated and theoretical data based on which the white-box-model 142 is generated are shown.

The trained model 136 may comprise a serial or parallel architecture. In the serial architecture output 146 of the white-box-model 142 is used as input for the black-box-model 144 or output 148 of the black-box-model 144 is used as input for the white-box-model 142. In the parallel architecture a combined output 150 of the white-box-model 142 and the black-box-model 144 is determined such as by superposition of the outputs 146, 148. For further details of serial and parallel architecture reference is made to the review paper of Moritz von Stoch et al.: "Hybrid semi-parametric modeling in process systems engineering: Past, present and future", 2014, Computers & Chemical Engineering, pergamon press, Oxford, GB, vol. 60, 31 Aug. 2013, pages 86 to 101 XP028792356, ISSN: 0098-1354, DOI: 10.1016/J.COMPCHEMENG.2013.08.008. FIG. 3 shows embodiments of a serial architecture, wherein a combined output of the white-box-model and the black-box-model is calculated in addition.

The trained model 136 may comprise at least one sub-model, in particular a plurality of submodels. For example, the sub-model may be a white-box-model and/or at least one of the submodels may be a white-box-model. The trained model 136 may comprise a plurality of sub-models, such as for at least one of the production steps and/or for at least one of the process steps and/or for at least one production line 116, which are white-box-models or either hybrid models or pure data-driven models. Each sub-model may be either responsible for predicting operating conditions or for providing input to other sub-models that predict the operating conditions. The trained model 136 is built to predict controllable parameters, which are directly controllable in the real production process. Such parameters may be flagged via the meta data in a production plant layout file.

Production by the production plant 510 may comprise a plurality of production steps. The trained model 136 can either represent a single production step or a group of production steps. The trained model 136 is configured for predicting the operating conditions for a single production step or for a group of production steps. Ideally, the full process chain including each controllable element may be predicted. The trained model 136 may be configured for predicting operating conditions for a single production line 516 or a group of production lines 516. For example, the production line 516 may comprise at least one reactor 526 and at least one processing unit 520. The trained model 136 may be configured for predicting operating conditions for the reactor and/or the solids processing units 520.

As outlined above, the process chain 512 may comprise arbitrary combinations of continuous and batch processes. The trained model 136 may be configured to provide operating conditions relating to the best route through the processing chain 516 for achieving the quality criterion. Additionally, other criteria for determining the best route through the processing chain may be considered such as an order queue or the like. The trained model 136 may comprise and/or cover continuous process 522 or part of the production process, such as polyurethane production on a reactor. Additionally, the batch process 514 for finishing the raw product leading to the end product may be comprised in the trained model 136. These finishing operations may comprise, for example, milling, expanding TPUs. The trained model 136 may comprise unit operations 518 relating to each batch process 514 of the process chain 512. The unit operations 518 may be included in the trained model 136 as a pre-defined set of combinations depending on the industrial application and respective product properties. Specifically, the batch process 514 may be modelled based on the output of the trained model 136 covering the continuous process 522 or part of the production process which in such case may provide an intermediate quality criterion. Every batch process 514 or route may have its own model. For each unit operation 518 combination, a model may be trained and selected for prediction depending on the input data, in particular the customer's input.

The trained model 136 may comprise a model for a pre-defined route through the process chain 512. For example, in particular for TPU and/ETPU production, the trained model 136 may comprise model parts relating to the reactor and pre-defined unit operations. For example, a plurality of different pre-defined routes may exist, wherein based on the quality criterion a matching or fitting route is selected for which the operating conditions are determined. Alternatively to a predefined route through the process chain 512, at least one optimization problem may be defined based on an objective function. For example, graph theory may be used to find optimal operating conditions and the optimal combination of continuous process 522 and batch process 514. Thus, the best routes may be trained and may be predicted in addition to the operating conditions. The batch process 514 may comprise different routes through the production plant 510 depending on the quality criterion and/or workload of the production plant 510. For example, for the production lines 516 of FIG. 5A, unit operations 518 and units 520 may be combined such that it is possible to reach and/or ensure an optimum in terms of the at least one quality criterion.

As further shown in FIG. 5A, the production plant 510 may be controlled by a controlling system 556. The controlling system 556 comprises at least one communication interface 558 configured for determining of input data. The communication interface 558 is configured for retrieving the production plant layout data and for receiving information relating to the quality criterion. The controlling system 556 comprises at least one prediction unit 560 configured for determining operating conditions for operating the production plant 510 by applying at least one trained model 536 on the input data. The controlling system 556 comprises at least one output device 562 configured for providing the operating conditions.

The production plant 510 may be controlled according to the determined operating conditions. The operating conditions for each controllable element may be provided. The trained model 536 may be configured for predicting controllable parameters, which are directly controllable in a real production process. Such parameters may be flagged via meta data in the production plant layout file. In particular, the reactor 526 of the polyurethane production process may be controlled according to the provided operating conditions to reach optimal outcome.

The method may comprise determining a production plan for runs of the production plant 510 based on the determined operating conditions. The method may allow controlling the production plant by the controlling system 556 and/or a scheduler and in particular optimal production planning. Once the customer places the order including the desired specification, optimal operating conditions may be determined with the trained model 536. A full production plan may be evaluated by the controlling system 556 and/or may be passed to the scheduler, which rank the incoming production runs based, for example, on similarity in quality criteria, reactor allocation, operating conditions, prizes of raw material, urgencies, batch sizes and the like. Additionally, controlling system 556 and/or the scheduler may be in communication with transport planning system for logistic triggering required transportation terminals to be on site to pick-up final production batches and transport them to the customer's location. Additionally, the controlling system 556 and/or the scheduler might be used for forecasting inventory levels based on the fully digitalized production planning.

LIST OF REFERENCE NUMBERS 110 production plant
112 process chain
114 batch process
116 production line
118 unit operations
120 unit
122 continuous process
124 raw material
126 reactor
128 raw powder
132 determining of input data
134 prediction step
136 trained model
138 finished powder
140 control and monitoring step
142 white-box-model
144 black-box-model
146 output
148 output
150 combined output
152 experimental data
154 theoretical data
156 controlling system
158 communication interface
160 prediction unit
162 output device

The invention claimed is:

1. A computer-implemented method for controlling and/or monitoring a chemical production plant, wherein the chemical production plant comprises at least one process chain comprising at least one batch process, the method comprising:
   a) at least one step of determining of input data, wherein the input data comprises at least one quality criterion and production plant layout data, wherein the step comprises retrieving the production plant layout data and receiving information relating to the quality criterion via at least one communication interface;
   b) at least one prediction step, wherein in the prediction step operating conditions for operating the chemical production plant are determined by applying at least one trained model on the input data, wherein the trained model is at least partially data-driven by being trained on sensor data from historical production runs;
   c) at least one control and/or monitoring step, the operating conditions are provided and determining a production plan for runs of the chemical production plant based on the operating conditions and scheduling the production plan using a scheduler, and
   wherein the trained model comprises a combination of a white-box-model and a black-box-model, wherein the white-box-model is based on physico-chemical laws, wherein the black-box-model is based on the sensor data from historical production runs, and
   controlling the chemical production plant based on the production plan.

2. The method according to claim 1, wherein the chemical production plant comprises at least two sequential processes.

3. The method according to claim 1, wherein the chemical production plant is controlled according to the determined operating conditions.

4. The method according to claim 3, wherein the operating conditions for each controllable element are provided, wherein the trained model is configured for predicting controllable parameters, which are directly controllable in a real production process.

5. The method according to claim 1, wherein the trained model is configured for providing operating conditions relating to a best route through the processing chain for achieving the quality criterion.

6. The method according to claim 1, wherein a production plan for runs of the chemical production plant is determined based on the determined operating conditions.

7. The method according to claim 1, wherein the information relating to the quality criterion comprises at least one customer specification, wherein the customer specification comprises at least one range for at least one quality parameter.

8. The method according to claim 1, wherein the production plant layout data comprises real time data, wherein the real time data comprises information about a current state of the chemical production plant.

9. The method according to claim 1, wherein the production plant layout data comprises pre-defined layout parameters, wherein the pre-defined layout parameters are retrieved from at least one database via the communication interface.

10. The method according to claim 1, wherein the chemical production plant is configured for continuous processing.

11. The method according to claim 1, wherein production by the chemical production plant comprises a plurality of production steps, wherein the trained model is configured for predicting the operating conditions for a single production step or for a group of production steps.

12. The method according to claim 1, wherein the trained model is a hybrid model.

13. The method according to claim 1, wherein the trained model comprises at least one sub-model, wherein the sub-model is one or more of a white-box-model, a hybrid model or a data-driven model.

14. The method according to claim 13, wherein the trained model comprises a plurality of sub-models, which are white-box-models or either hybrid models or pure data-driven models, wherein each sub-model is either responsible for predicting operating conditions or for providing input to other sub-models that predict the operating conditions.

15. The method according to claim 1, wherein the black-box-model is built by using one or more of machine learning, deep learning, neural networks, or other form of artificial intelligence.

16. The method according to claim 1, wherein the chemical production plant is a powder production plant configured for producing at least one powder, wherein the powder is at least one powder selected from the group consisting of: carbonyl iron powder (CIP); iron powder; carbon black; nickel; iron; zinc oxide; titanium dioxide.

17. A computer program, specifically an application, for controlling and/or monitoring a chemical production plant, wherein the chemical production plant comprises at least one process chain comprising at least one batch process, wherein the computer program comprises instructions which, when the program is executed by a computer or computer network, cause the computer or computer network to carry out the following steps:
   i) determining of input data, wherein the input data comprises at least one quality criterion and production plant layout data, wherein the step comprises retrieving the production plant layout data and receiving information relating to the quality criterion via at least one communication interface;
   ii) determining operating conditions for operating the chemical production plant by applying at least one trained model on the input data, wherein the trained model is at least partially data-driven by being trained on sensor data from historical production runs;
   iii) providing the operating conditions, and determining a production plan for runs of the chemical production plant based on the operating conditions and scheduling the production plan using a scheduler,
   wherein the trained model comprises a combination of a white-box-model and a black-box-model, wherein the white-box-model is based on physico-chemical laws, wherein the black-box-model is based on the sensor data from historical production runs, and
   controlling the chemical production plant based on the production plan.

18. A controlling system for controlling and/or monitoring a chemical production plant, wherein the chemical production plant comprises at least one process chain comprising at least one batch process, wherein the controlling system comprises at least one communication interface configured for determining of input data, wherein the input data comprises at least one quality criterion and production plant layout data, wherein the communication interface is configured for retrieving the production plant layout data and for receiving information relating to the quality criterion, wherein the controlling system comprises at least one prediction unit configured for determining operating conditions for operating the chemical production plant by applying at least one trained model on the input data, wherein the trained model is at least partially data-driven by being trained on sensor data from historical production runs, wherein the controlling system comprises at least one output device configured for providing the operating conditions, and further comprising a scheduler configured to determine a production plan for runs of the chemical production plant based on the operating conditions and to schedule the production plan, and wherein the trained model comprises a combination of a white-box-model and a black-box-model, wherein the white-box-model is based on physico-chemical laws, wherein the black-box-model is based on the sensor data from historical production runs, and controlling the chemical production plant based on the production plan.

\* \* \* \* \*